(12) United States Patent
Lee

(10) Patent No.: US 9,792,036 B2
(45) Date of Patent: Oct. 17, 2017

(54) MOBILE TERMINAL AND CONTROLLING METHOD TO DISPLAY MEMO CONTENT

(75) Inventor: Kijun Lee, Gyeonggi-do (KR)

(73) Assignee: LG ELECTRONICS INC., Seoul (KR)

(*) Notice: Subject to any disclaimer, the term of this patent is extended or adjusted under 35 U.S.C. 154(b) by 529 days.

(21) Appl. No.: 13/313,224

(22) Filed: Dec. 7, 2011

(65) Prior Publication Data
US 2013/0021270 A1 Jan. 24, 2013

(30) Foreign Application Priority Data
Jul. 19, 2011 (KR) ........................ 10-2011-0071288

(51) Int. Cl.
G06F 3/0488 (2013.01)
G06F 3/0481 (2013.01)
H04M 1/725 (2006.01)

(52) U.S. Cl.
CPC ...... G06F 3/04883 (2013.01); G06F 3/04817 (2013.01); G06F 2203/04803 (2013.01);
(Continued)

(58) Field of Classification Search
CPC ...... G06F 3/16; G06F 17/241; G06F 3/04883; G06F 3/0481; G06F 3/017; G06F 3/041; G06F 3/0488; G06F 3/0482; G06F 3/0484; G06F 3/04842; G06F 3/048; H04W 4/12; H04W 4/14; H04W 88/184; H04M 1/72547; H04M 3/42382; H04N 2101/00; H04N 2201/3277; H04N 1/2112; H04N 2201/0084; H04N 2201/3225; G10L 15/26; G06Q 10/10
(Continued)

(56) References Cited

U.S. PATENT DOCUMENTS

2004/0005877 A1* 1/2004 Vaananen ................ 455/412.1
2005/0052427 A1 3/2005 Wu et al.
(Continued)

FOREIGN PATENT DOCUMENTS

EP 1 956 809 8/2008
EP 2 284 675 2/2011
WO WO2009071112 A1 * 12/2007 ............ H04M 1/725

OTHER PUBLICATIONS

European Search Report dated Nov. 6, 2012 for Application 11194400.5.

Primary Examiner — Sang H Kim
(74) Attorney, Agent, or Firm — Ked & Associates, LLP

(57) ABSTRACT

A mobile terminal and method may be provided. A memo application function may be quickly provided through a single user action only. A touch screen may receive first user action for executing a memo application, and may receive second user action for receiving an input for a memo while the memo application is executing. A controller may execute the memo application in accordance with the first user action, and analyze the second user action and produce memo content according to the analyzed second user action. The controller may execute the memo application in response to initiation of the first user action, the controller may end execution of the memo application when the first user action is terminated, and the controller may control the memo content to be saved in memory in response to ending execution of the memo application.

17 Claims, 25 Drawing Sheets

(52) U.S. Cl.
CPC ............ *G06F 2203/04808* (2013.01); *H04M 1/72522* (2013.01); *H04M 2250/22* (2013.01); *H04M 2250/68* (2013.01); *H04M 2250/70* (2013.01)

(58) Field of Classification Search
USPC ..... 715/230, 716, 727, 728, 863; 455/412.1, 455/466, 413; 379/88.26, 88.22, 67.1; 348/333.02
See application file for complete search history.

(56) References Cited

U.S. PATENT DOCUMENTS

| | | | |
|---|---|---|---|
| 2005/0190279 A1* | 9/2005 | Nobels | 348/333.02 |
| 2007/0106931 A1* | 5/2007 | Vartiainen et al. | 715/512 |
| 2009/0140997 A1 | 6/2009 | Jeong et al. | |
| 2009/0273587 A1 | 11/2009 | Tsuei et al. | |
| 2010/0146235 A1* | 6/2010 | Weber et al. | 711/165 |
| 2010/0210293 A1* | 8/2010 | Lim | H04M 1/274516 455/466 |
| 2010/0216447 A1* | 8/2010 | Park et al. | 455/418 |
| 2010/0234072 A1* | 9/2010 | Ambiru | H04M 1/72552 455/563 |
| 2010/0257447 A1* | 10/2010 | Kim | G06F 3/04883 715/702 |
| 2010/0262659 A1* | 10/2010 | Christiansen | G06F 17/241 709/205 |
| 2011/0060986 A1 | 3/2011 | Yang | |
| 2011/0074693 A1* | 3/2011 | Ranford | G01C 21/3608 345/173 |
| 2011/0115721 A1 | 5/2011 | Li et al. | |
| 2011/0287810 A1* | 11/2011 | Zelber et al. | 455/566 |
| 2012/0023506 A1* | 1/2012 | Maeckel et al. | 719/318 |
| 2012/0233571 A1* | 9/2012 | Wever | G06F 3/048 715/835 |

* cited by examiner (a)

(b)

MOBILE TERMINAL AND CONTROLLING
METHOD TO DISPLAY MEMO CONTENT

CROSS-REFERENCE TO RELATED
APPLICATION(S)

Pursuant to 35 U.S.C. §119(a), this application claims the benefit of earlier filing date and right of priority to Korean Application No. 10-2011-0071288, filed on Jul. 19, 2011, the contents of which are hereby incorporated by reference herein in their entirety.

BACKGROUND

1. Field

The present invention relates to a mobile terminal, and more particularly, to a mobile terminal and controlling method thereof. Although the present invention is suitable for a wide scope of applications, it is particularly suitable for performing a memo recording quickly and conveniently through a convenient touch action.

2. Background

Generally, terminals can be classified into mobile/portable terminals and stationary terminals. The mobile terminals can be classified into handheld terminals and vehicle mount terminals again according to possibility of user's direct portability.

As functions of the terminal are diversified, the terminal is implemented as a multimedia player provided with composite functions such as photographing of photos or moving pictures, playback of music or moving picture files, game play, broadcast reception and the like for example.

To support and increase of the terminal functions, it may be able to consider the improvement of structural part and/or software part of the terminal.

The ongoing development of functions of a terminal enables a memo function, which used to be performed in a manner of writing a memo on a paper, through a terminal. Thus, a memo can be instantly recorded in a terminal without a separate paper memo pad.

Generally, it is essential for a memo function to be quickly implemented due to attributes of a memo. However, a related art terminal having a conventional memo function is able to execute the memo function through several steps to implement the memo function, thereby causing a problem.

SUMMARY OF THE INVENTION

Accordingly, the present invention is directed to a mobile terminal and controlling method thereof that substantially obviate one or more problems due to limitations and disadvantages of the related art.

An object of the present invention is to provide a mobile terminal and controlling method thereof, by which a memo application function can be quickly provided through a single user action only.

Another object of the present invention is to provide a mobile terminal and controlling method thereof, by which a written memo can be saved as soon as a memo application is ended after completion of writing a corresponding memo.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a memory, a touch screen to receive a first user action for executing a memo application, and to receive a second user action for receiving an input for a memo while the memo application is executing, and a controller to execute the memo application in accordance with the first user action, and to analyze the second user action and produce a memo content according to the analyzed second user action, wherein the controller executes the memo application in response to an initiation of the first user action, wherein the controller ends execution of the memo application when the first user action is terminated, and wherein the controller controls the memo content to be saved in the memory in response to ending the execution of the memo application.

Preferably, the touch screen displays the produced memo contents after producing the memo content.

Preferably, the touch screen displays a specific icon related to the memo application, and wherein the first user action includes a touch action on the specific icon.

More preferably, the first user action includes a touch action on a specific position of a display region of the touch screen.

Preferably, the controller controls a memo window to receive the input of the memo to be displayed on the touch screen by executing the memo application, and wherein the second user action includes a touch action on the memo window.

Preferably, the controller controls the memo content to be saved in the memory as at least one of a text file, an image file or an audio file.

More preferably, the controller determines a substance of the memo content, and the controller executes at least one specific application using the determined substance of the memo content.

Preferably, the at least one specific application includes at least one of an internet search application, a call application, a message sending application or a word processor application.

Preferably, the mobile terminal further includes a microphone module to receive an input of an external audio, wherein the controller receives the external audio via the microphone module in accordance with the execution of the memo application, and wherein the controller provides the received external audio to be part of the memo content and then controls the memo content to be saved in the memory.

Preferably, the mobile terminal further includes a camera module to receive an input of an external image, wherein the controller receives the external image via the camera module in accordance with the execution of the memo application, and wherein the controller provides the received external image to be part of the memo content and then controls the memo content to be saved in the memory.

Preferably, the second user action includes a touch action to select a specific content displayed on the touch screen, and wherein the controller controls the specific content selected by the second user action to be saved as the memo content in the memory in accordance with the execution of the memo application.

In another aspect of the present invention, a method of controlling a mobile terminal includes the steps of executing a memo application in response to an initiation of a first user action via a touch screen, receiving a second user action to receive information of a memo via the touch screen, analyzing the received second user action, producing a memo content according to the analyzed second user action, and saving the memo content and ending the memo application, based on termination of the first user action.

It is to be understood that both the foregoing general description and the following detailed description of the present invention are exemplary and explanatory and are intended to provide further explanation of the invention as claimed.

BRIEF DESCRIPTION OF THE DRAWINGS

Arrangements and embodiments will be described in detail with reference to the following drawings in which like reference numerals refer to like elements and wherein.

DETAILED DESCRIPTION

Reference will now be made in detail to the preferred embodiments of the present invention, examples of which are illustrated in the accompanying drawings. Wherever possible, the same reference numbers will be used throughout the drawings to refer to the same or like parts. The suffixes 'module' and 'unit' for the elements used in the following description are given or used in common by considering facilitation in writing this disclosure only but fail to have meanings or roles discriminated from each other.

First of all, mobile terminals described in this disclosure can include a mobile phone, a smart phone, a laptop computer, a digital broadcast terminal, a PDA (personal digital assistants), a PMP (portable multimedia player), a navigation system and the like.

Except a case applicable to a mobile terminal only, it is apparent to those skilled in the art that the configurations according to an embodiment described in this disclosure is applicable to such a stationary terminal as a digital TV, a desktop computer and the like.

Figure 1:
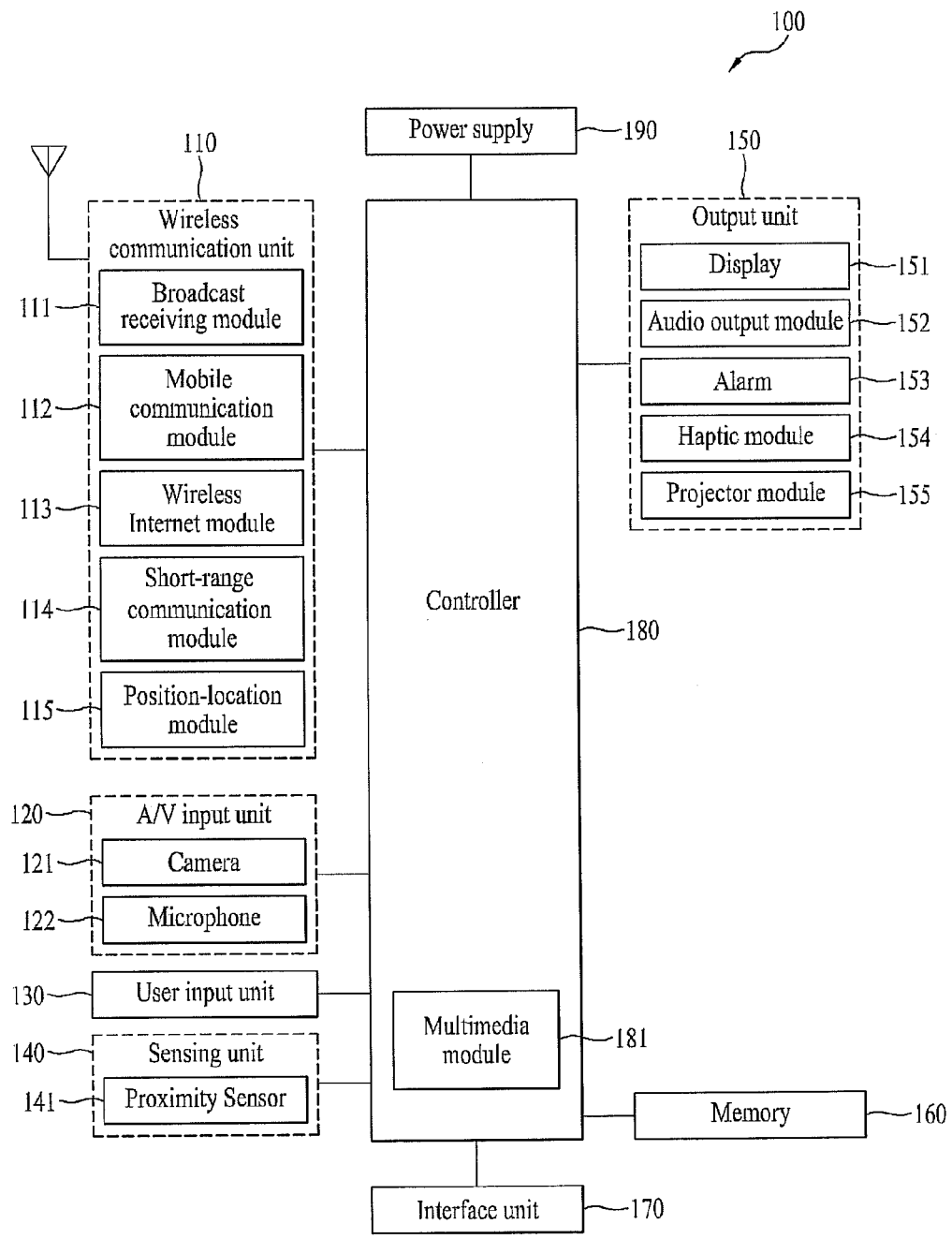
FIG. 1 is a block diagram of a mobile terminal according to one embodiment of the present invention.

FIG. 1 is a block diagram of a mobile terminal according to one embodiment of the present invention.

Referring to FIG. 1, a mobile terminal 100 according to one embodiment of the present invention includes a wireless communication unit 110, an NV (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By non-limiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless Internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display unit 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display unit 151, an audio output module 152, an alarm unit 153, a haptic module 154, a projector module 155 and the like.

The display unit 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display unit 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display unit 151 can be implemented in the optical transmittive type as well. In this configuration, a user is able to see an object in rear of a terminal body via the area occupied by the display unit 151 of the terminal body.

At least two display units 151 can be provided to the mobile terminal 100 in accordance with the implemented configuration of the mobile terminal 100. For instance, a plurality of display units can be arranged on a single face of the mobile terminal 100 in a manner of being spaced apart from each other or being built in one body. Alternatively, a plurality of display units can be arranged on different faces of the mobile terminal 100.

In case that the display unit 151 and a sensor for detecting a touch action (hereinafter called 'touch sensor') configures a mutual layer structure (hereinafter called 'touchscreen'), it is able to use the display unit 151 as an input device as well as an output device. In this case, the touch sensor can be configured as a touch film, a touch sheet, a touchpad or the like.

The touch sensor can be configured to convert a pressure applied to a specific portion of the display unit 151 or a variation of a capacitance generated from a specific portion of the display unit 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display unit 151 is touched.

Referring to FIG. 1, a proximity sensor (not shown in the drawing) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display unit 151 or the audio output unit 152. Hence, the display unit 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display unit 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2A:
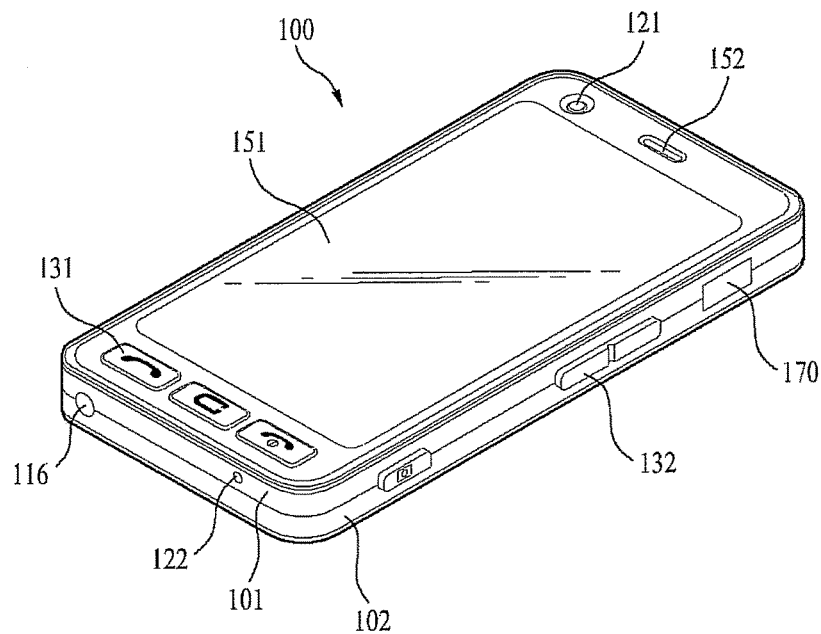
FIG. 2A is a front perspective diagram of a mobile terminal according to one embodiment of the present invention.

FIG. 2A is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display unit 151, an audio output unit 152, a camera 121, user input units 130/131 and 132, a microphone 122, an interface 180 and the like can be provided to the terminal body, and more particularly, to the front case 101.

The display unit 151 occupies most of a main face of the front case 101. The audio output unit 151 and the camera 121 are provided to an area adjacent to one of both end portions of the display unit 151, while the user input unit 131 and the microphone 122 are provided to another area adjacent to the other end portion of the display unit 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display unit 151 or the like can be inputted to the second manipulating unit 132.

Figure 2B:
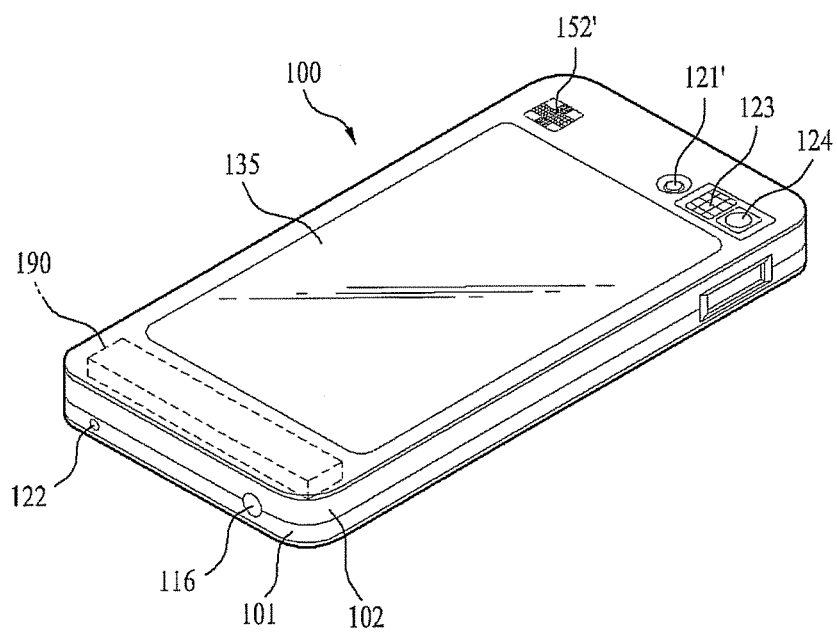
FIG. 2B is a rear perspective diagram of a mobile terminal according to one embodiment of the present invention.

FIG. 2B is a perspective diagram of a backside of the terminal shown in FIG. 2A.

Referring to FIG. 2B, a camera 121' can be additionally provided to a backside of the terminal body, and more particularly, to the rear case 102. The camera 121 has a photographing direction that is substantially opposite to that of the former camera 121 shown in FIG. 21A and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2A and may be used for implementation of a speakerphone mode in talking over the terminal.

A broadcast signal receiving antenna 124 can be additionally provided to the lateral side of the terminal body as well as an antenna for communication or the like. The antenna 124 constructing a portion of the broadcast receiving module 111 shown in FIG. 1 can be retractably provided to the terminal body.

A power supply unit 190 for supplying a power to the terminal 100 is provided to the terminal body. And, the power supply unit 190 can be configured to be built within the terminal body. Alternatively, the power supply unit 190 can be configured to be detachably connected to the terminal body.

A touchpad 135 for detecting a touch can be additionally provided to the rear case 102. The touchpad 135 can be configured in a light transmittive type like the display unit 151. In this case, if the display unit 151 is configured to output visual information from its both faces, it is able to recognize the visual information via the touchpad 135 as well. The information outputted from both of the faces can be entirely controlled by the touchpad 135. Alternatively, a display is further provided to the touchpad 135 so that a touchscreen can be provided to the rear case 102 as well.

The touchpad 135 is activated by interconnecting with the display unit 151 of the front case 101. The touchpad 135 can be provided in rear of the display unit 151 in parallel. The touchpad 135 can have a size equal to or smaller than that of the display unit 151.

Interconnected operational mechanism between the display unit 151 and the touchpad 135 are explained with reference to FIG. 3A and FIG. 3B as follows.

Figure 3A:
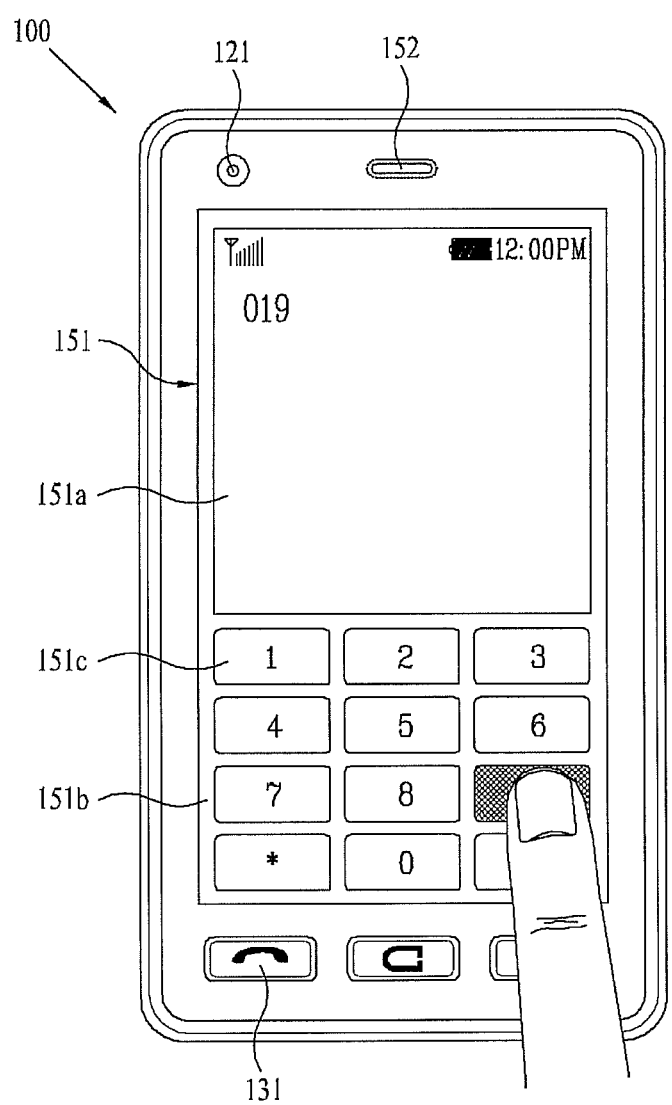
FIGS. 3A and 3B is front diagram of a mobile terminal according to one embodiment of the present invention for explaining one operational status of the mobile terminal.
Figure 3B:
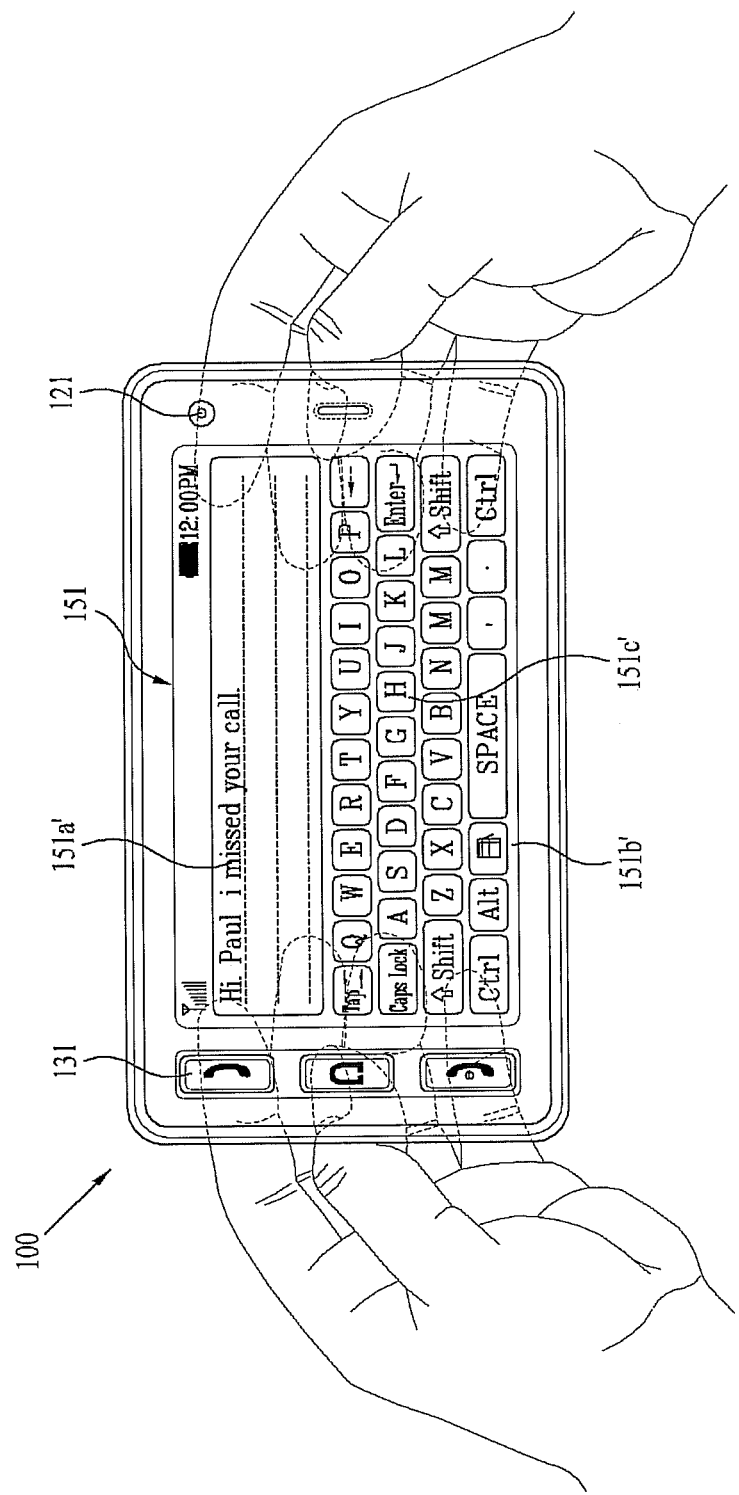

FIG. 3A and FIG. 3B are front-view diagrams of a terminal according to one embodiment of the present invention for explaining an operational state thereof.

First of all, various kinds of visual informations can be displayed on the display unit 151. And, theses informations can be displayed in characters, numerals, symbols, graphics, icons and the like.

In order to input the information, at least one of the characters, numerals, symbols, graphics and icons are represented as a single predetermined array to be implemented in a keypad formation. And, this keypad formation can be so-called 'soft keys'.

FIG. 3A shows that a touch applied to a soft key is inputted through a front face of a terminal body.

The display unit 151 is operable through an entire area or by being divided into a plurality of regions. In the latter case, a plurality of the regions can be configured interoperable.

For instance, an output window 151a and an input window 151b are displayed on the display unit 151. A soft key 151c representing a digit for inputting a phone number or the like is outputted to the input window 151b. If the soft key 151c is touched, a digit corresponding to the touched soft key is outputted to the output window 151a. If the first manipulating unit 131 is manipulated, a call connection for the phone number displayed on the output window 151a is attempted.

FIG. 3B shows that a touch applied to a soft key is inputted through a rear face of a terminal body. If FIG. 3A shows a case that the terminal body is vertically arranged (portrait), FIG. 3B shows a case that the terminal body is horizontally arranged (landscape). And, the display unit 151 can be configured to change an output picture according to the arranged direction of the terminal body.

FIG. 3B shows that a text input mode is activated in the terminal.

An output window 151a' and an input window 151b' are displayed on the display unit 151. A plurality of soft keys 151c' representing at least one of characters, symbols and digits can be arranged in the input window 151b'. The soft keys 151c' can be arranged in the QWERTY key formation.

If the soft keys 151c' are touched through the touchpad (cf. '135' in FIG. 2B), the characters, symbols and digits corresponding to the touched soft keys are outputted to the output window 151a'. Thus, the touch input via the touchpad 135 is advantageous in that the soft keys 151c' can be prevented from being blocked by a finger in case of touch, which is compared to the touch input via the display unit 151. In case that the display unit 151 and the touchpad 135 are configured transparent, it is able to visually check fingers located at the backside of the terminal body. Hence, more correct touch inputs are possible.

Besides, the display unit 151 or the touchpad 135 can be configured to receive a touch input by scroll. A user scrolls the display unit 151 or the touchpad 135 to shift a cursor or pointer located at an entity (e.g., icon or the like) displayed on the display unit 151. Furthermore, in case that a finger is shifted on the display unit 151 or the touchpad 135, a path of the shifted finger can be visually displayed on the display unit 151. This may be useful in editing an image displayed on the display unit 151.

To cope with a case that both of the display unit (touchscreen) 151 and the touchpad 135 are touched together within a predetermined time range, one function of the terminal can be executed. The above case of the simultaneous touch may correspond to a case that the terminal body is held by a user using a thumb and a first finger (clamping). The above function can include activation or deactivation for the display unit 151 or the touchpad 135.

For clarity and convenience of the following description, assume that the mobile terminal mentioned in the following includes at least one of the components shown in FIG. 1.

Figure 4:
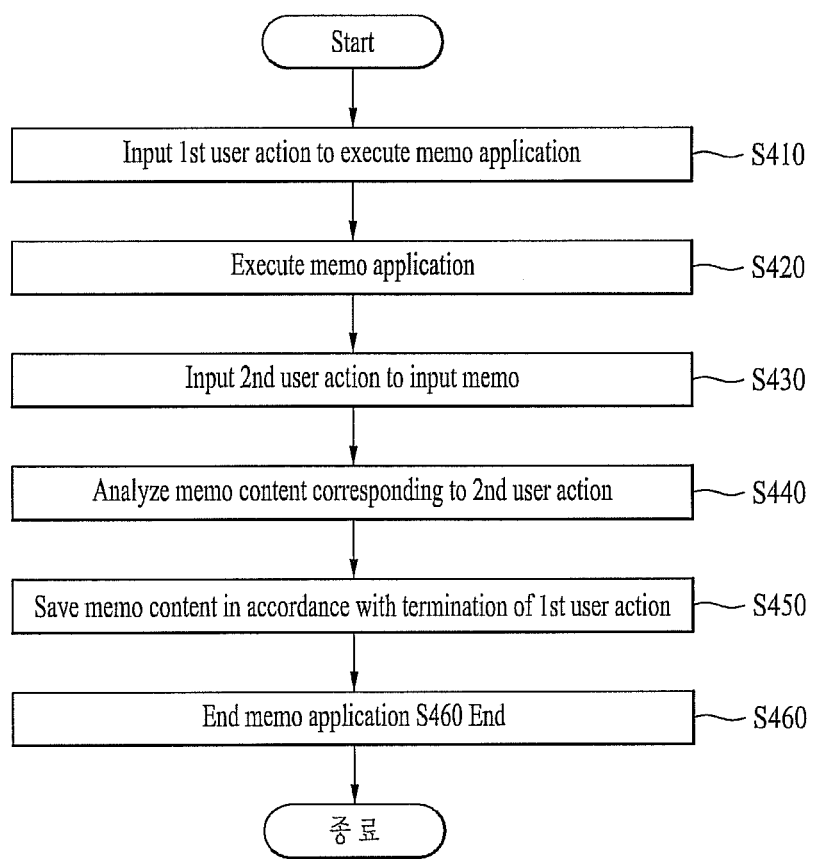
FIG. 4 is a flowchart for a mobile terminal controlling method according to the present invention.

FIG. 4 is a flowchart for a mobile terminal controlling method according to the present invention.

Referring to FIG. 4, the touchscreen 151 receives an input of a $1^{st}$ user action for executing a memo application [S410]. The controller 180 initiates the memo application in accordance with the 1$^{st}$ user action [S420]. The touchscreen 151 receives an input of a 2$^{nd}$ user action for receiving an input of a memo [S430]. The controller 180 analyzes a memo content matching the 2$^{nd}$ user action [S440]. The memory 160 stores the memo content as soon as the 1$^{st}$ user action is ended [S450]. Finally, the controller 180 ends the memo application [S460].

The terminology 'memo' used in the present specification means an action for a user to receive and save a target to record. In this case, the received target is not limited to a specific format. For instance, such a format as a text, an image, a video, a vice and the like can be used as a target of a memo. And, the terminology 'memo application, used in the present specification means an application to implement the memo action in the mobile terminal 100.

Figure 5:
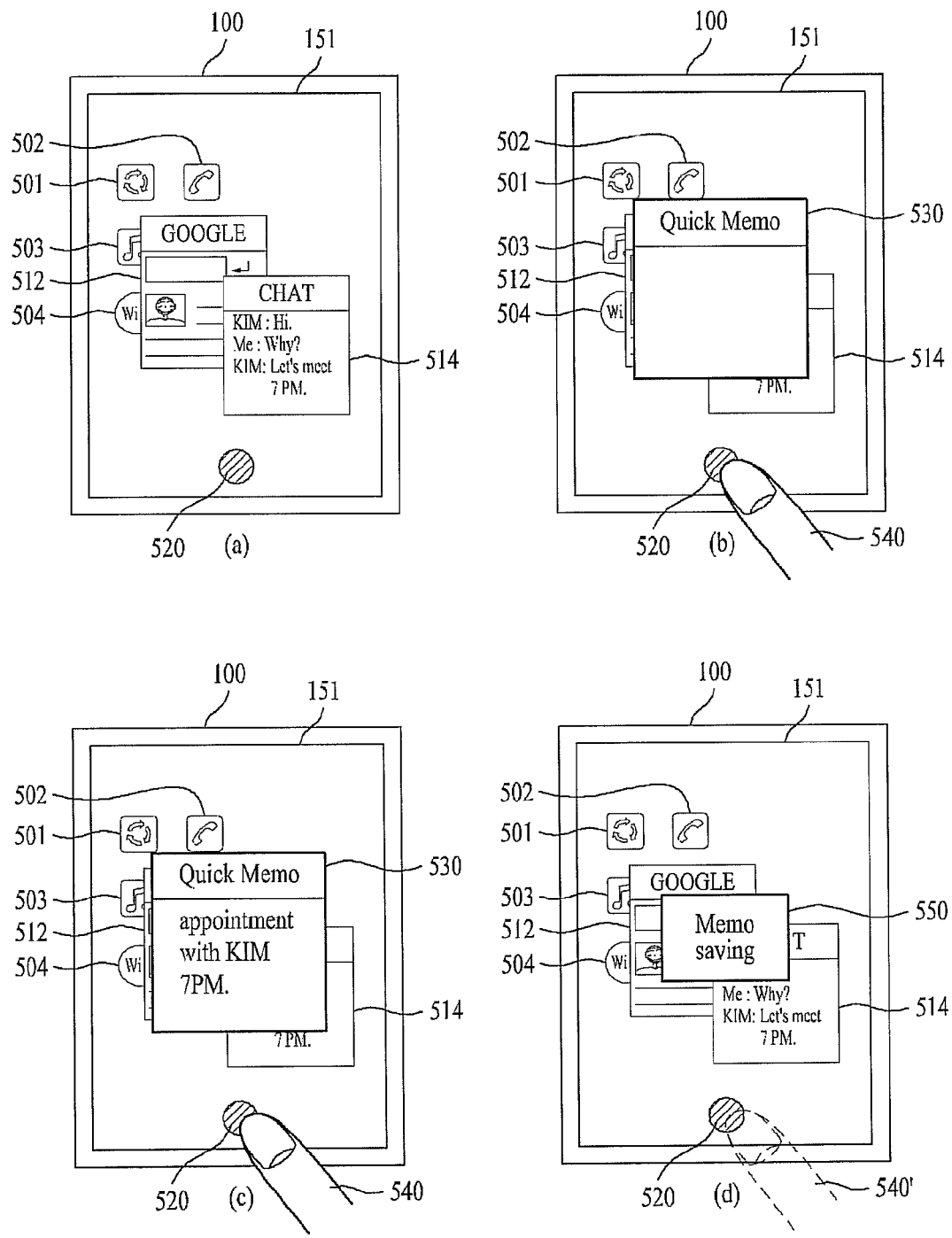
FIG. 5 is a schematic diagram for a mobile terminal controlling method according to the present invention.

FIG. 5 is a schematic diagram for a mobile terminal controlling method according to the present invention.

First of all, the present invention relates to an invention for quickly executing a memo application to enable a user to perform a memo action and for enabling the memo action to be performed. Actions related to a memo writing of the present invention can mainly include a 1$^{st}$ user action for implementing a memo application and a 2$^{nd}$ user action for performing a memo writing. The 1$^{st}$ and 2$^{nd}$ user actions are identified from each other for clarity and convenience of the following description. And, the 1$^{st}$ and 2$^{nd}$ user actions are implemented simultaneously or can be implemented as a single action. Although the present invention uses the terminology 'memo', actions in all formats for recording a specific content via a mobile terminal are applicable to the present invention.

Referring to FIG. 5 (a), the mobile terminal 100 displays a display screen before a memo application is executed. A plurality of icons 501 to 504 and implemented screens 512 and 514 of specific applications are displayed on the touchscreen 151.

Referring to FIG. 5 (b), the mobile terminal 100 receives an input of a 1$^{st}$ user action to execute the memo application from a user. If the memo icon 520 is touched via the 1$^{st}$ user action, the controller 180 recognizes the 1$^{st}$ user action as an execution command for executing the memo application. The controller 180 then performs a memo application executing operation in a manner of displaying a memo window 530 on the touchscreen 151. Hence, the touchscreen 151 is able to receive an input of a memo content via the memo window 530.

Referring to FIG. 5 (c), the mobile terminal 100 receives the memo content from the user. In the drawing, the user maintains the 1$^{st}$ user action of touching the memo icon 520. According to the present embodiment, the controller 180 sets the memo application to be executed while the user touches the memo icon 520 only. In doing so, the memo window 530 displays the memo content inputted via a 2$^{nd}$ user action in one of various ways.

Referring to FIG. 5 (d), the user ends the memo application by terminating the 1$^{st}$ user action. If the 1$^{st}$ user action maintained in FIG. 5 (c) and FIG. 5 (d) is terminated, the controller 180 is able to end the memo application by recognizing the termination of the 1$^{st}$ user action as the end of the memo application. In particular, when the user terminates the touch action on the memo icon 520, the controller 180 ends the memo application. In doing so, the controller 180 is able to save the written memo content in the memory 160 with reference to an end timing point of the memo application. In particular, it is able to set the memo, which has been written until the timing point of terminating the user's touch to the memo icon 520, to be automatically saved in the memory 160.

Figure 6A:
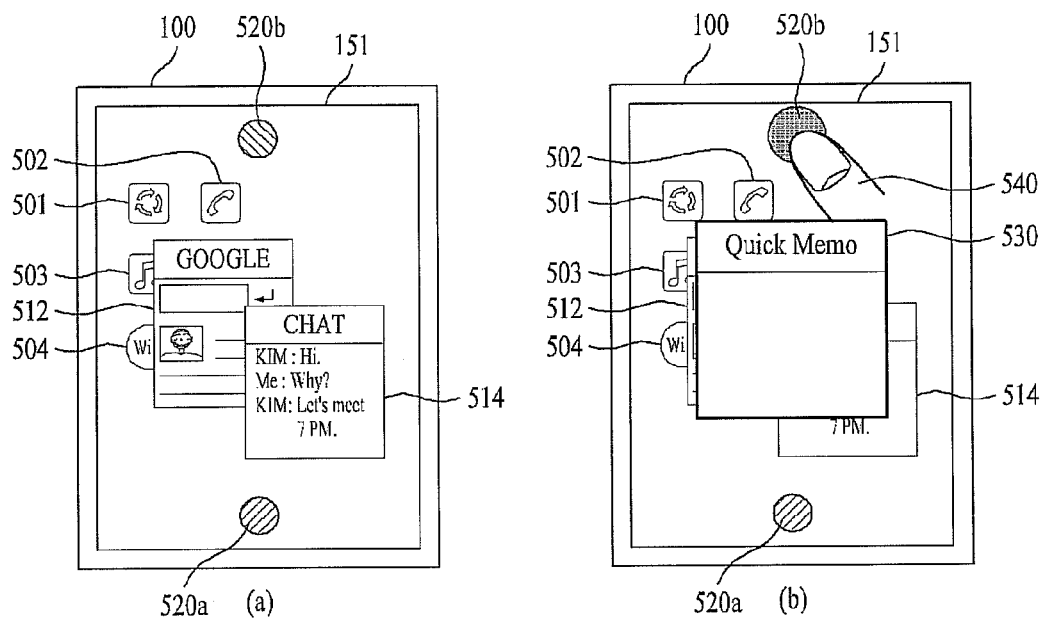
FIGS. 6A to 6C are diagrams of a $1^{st}$ user action for initiating a memo application according to the present invention.
Figure 6A:
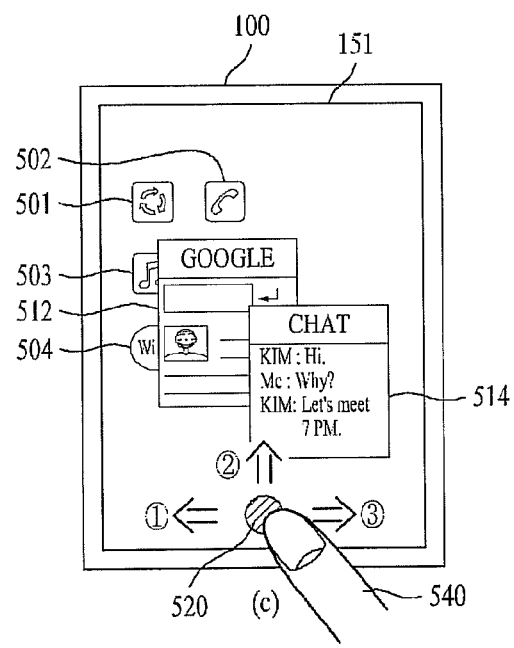
Figure 6B:
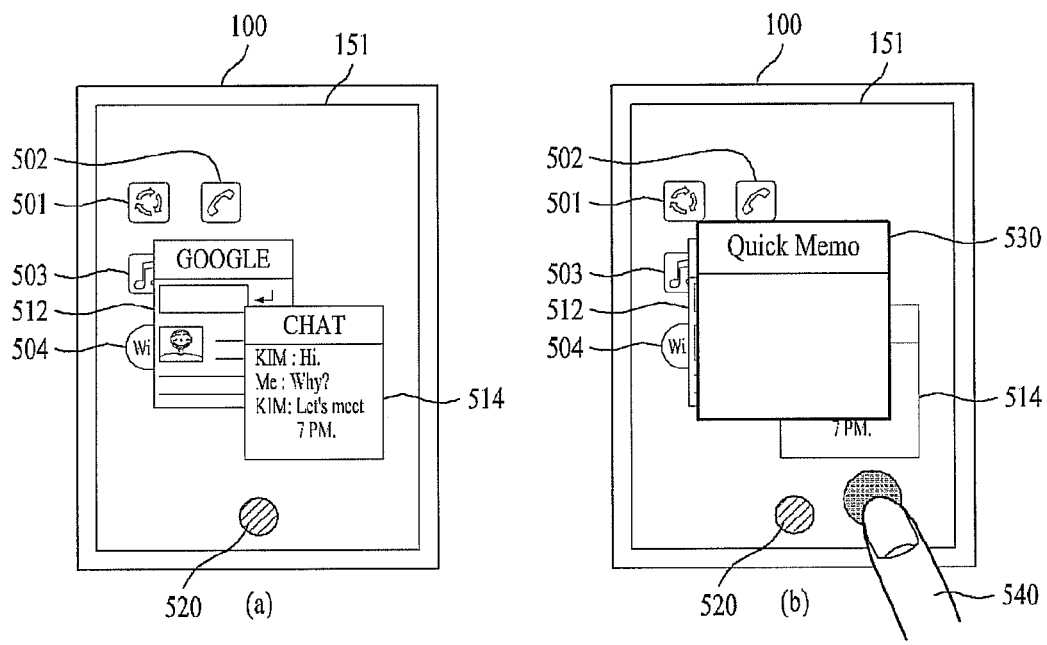
Figure 6B:
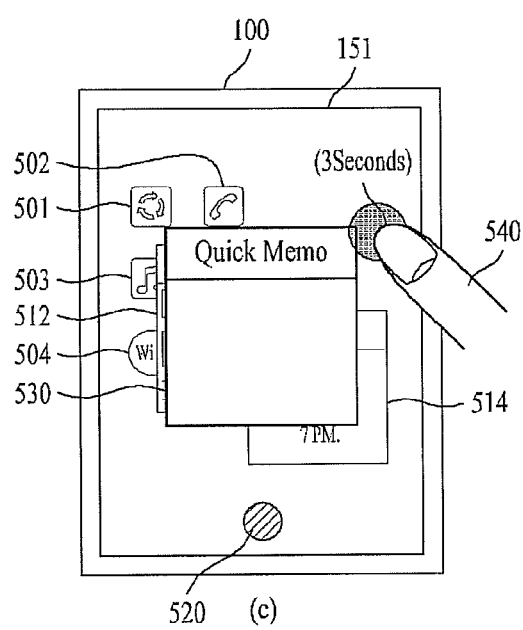
Figure 6C:
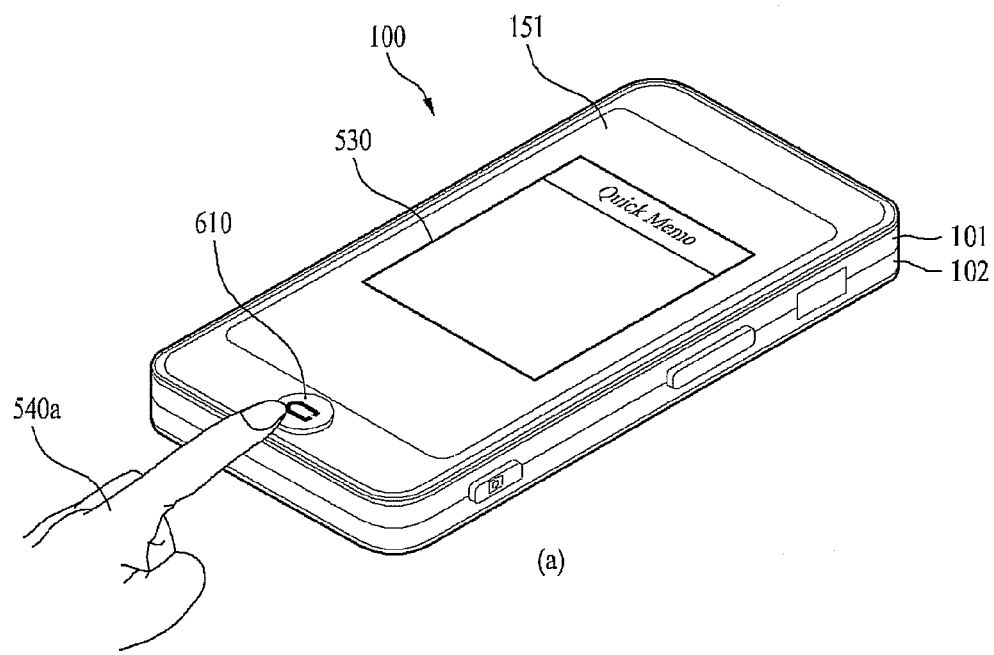
Figure 6C:
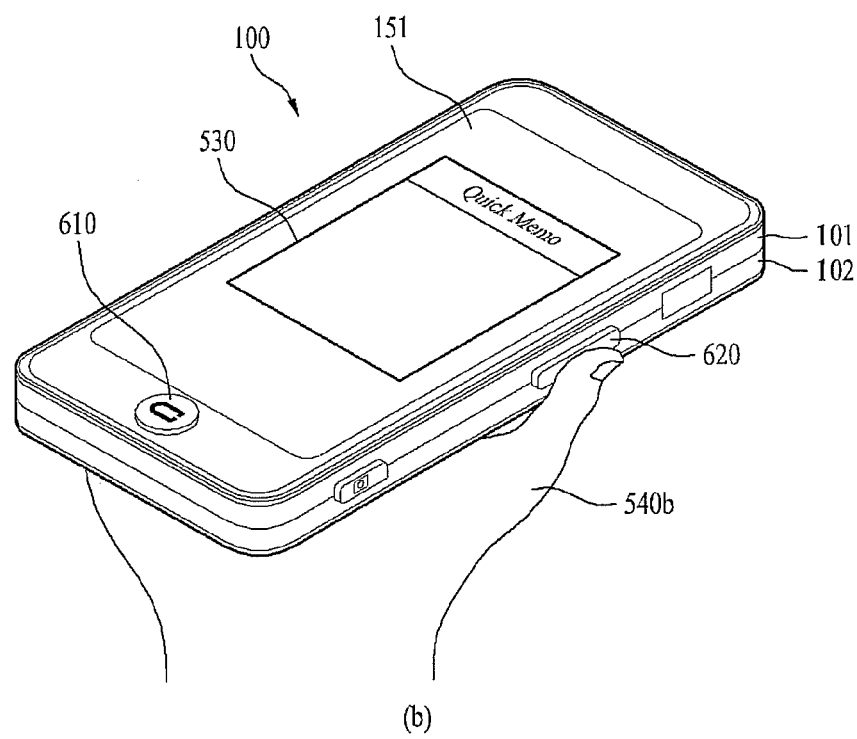

FIGS. 6A to 6C are diagrams of a 1$^{st}$ user action for initiating a memo application according to the present invention.

First of all, the terminology '1$^{st}$ user action' used in the present specification means an action inputted from a user to execute a memo application. The 1$^{st}$ user action is not limited to a specific action but is able to include every user action set by the controller 180 or the mobile terminal 100 to execute a memo application.

A 1$^{st}$ user action to execute a memo application can include such an action as a touch action, an action of shaking the mobile terminal 100, an action of inclining the mobile terminal 100, an action of pressing a specific button of the mobile terminal 100 and the like.

FIG. 6A shows an example of a 1$^{st}$ user action for executing a memo application via the aforesaid memo icon.

Referring to FIG. 6A (a), a plurality of memo icons 520a and 520b can be displayed on the touchscreen 151. A position and size of each of the memo icons are changeable in various ways in accordance with a user setting or a manufacturer setting. Moreover, the number of memo icons is adjustable in various ways as well, as shown in the drawing.

Referring to FIG. 6A (b), the touchscreen 151 receives an input of a user's touch action 540 on one 520b of a plurality of the memo icons 520a and 520b. The controller 180 then executes a memo application if receiving the input of the touch action on the corresponding memo icon from a user. In the drawing, a memo window 530 if displayed on the touchscreen 151, which is a memo application executing operation.

In the drawing, a timing point of a touch action on a memo icon and a memo window display initiated timing point are not clearly shown. Preferably, a memo window is displayed or a memo application is executed, at the same timing point of touching a memo icon.

Referring to FIG. 6A (c), a 1$^{st}$ user action to execute a memo application includes an action of shifting a memo icon 520 in accordance with a user's touch. Compared to FIG. 6A (b) showing that the memo application is executed by means of just touching the memo icon, FIG. 6A (c) shows an example of executing the memo application by means of touching and shifting the memo icon. This is to prevent the memo application from being frequently executed due to user's touch errors.

Meanwhile, the memo icon 520 can always exist at a specific position on the touchscreen 151. If so, it is possible to quickly execute a memo application. Yet, optionally, the memo icon 520 can be displayed on the touchscreen 151 if necessary in accordance with a setting. For instance, it is able to set the memo icon 520 to be displayed only if a user touches a specific position for a predetermined duration (e.g., 1 second).

FIG. 6B shows an operation of executing a memo application via another touch action except the memo icon touch action.

Referring to FIG. 6B (a), a display screen before executing a memo application is displayed if any user action is not inputted.

Referring to FIG. 6B(b), a user performs an action of touching a specific position instead of touching the memo icon 520. The controller 180 is able to previously set a 1$^{st}$ user action for executing a memo application to an action of touching the specific position. In the drawing, after the specific position has been set to a let bottom region of the touchscreen 151, if a user touches the specific position on the touchscreen 151, the controller 180 executes the memo application.

Referring to FIG. 6B(c) instead of using the memo icon 520, an action of pressing the touchscreen 151 for a predetermined duration (e.g., 3 second) is performed. The controller 180 sets a user action to a touch action maintained over the predetermined duration. If the controller 180 receives an input of the touch action maintained over the predetermined duration, the controller 180 executes the memo application and displays a memo window 530 on the touchscreen 151.

Figure 7A:
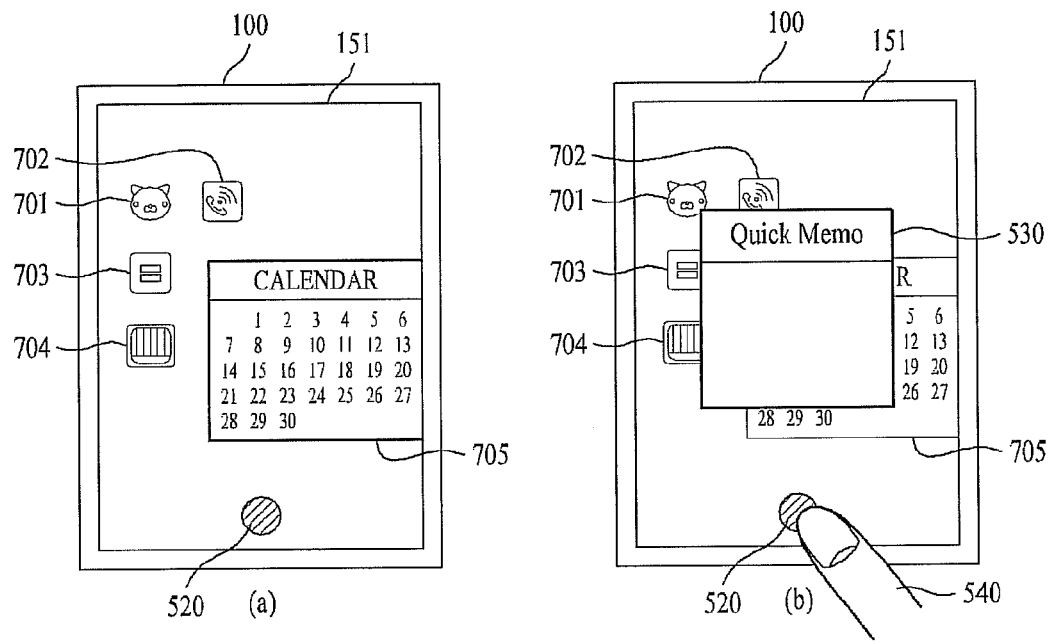
FIG. 7A and FIG. 7B are diagrams of an action for executing a memo application according to the present invention.
Figure 7A:
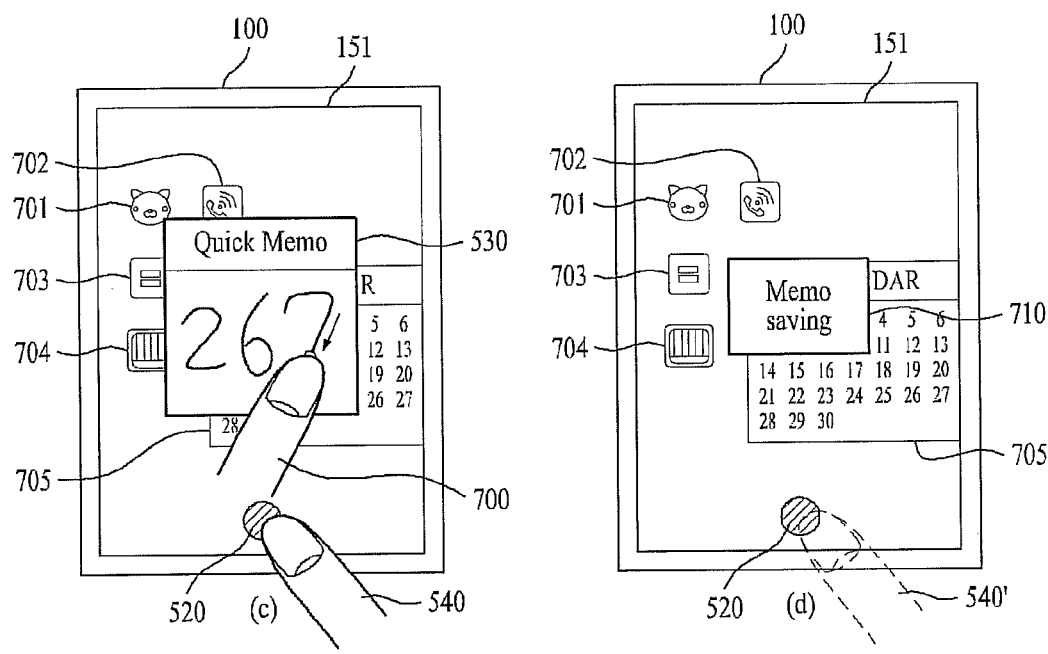
Figure 7B:
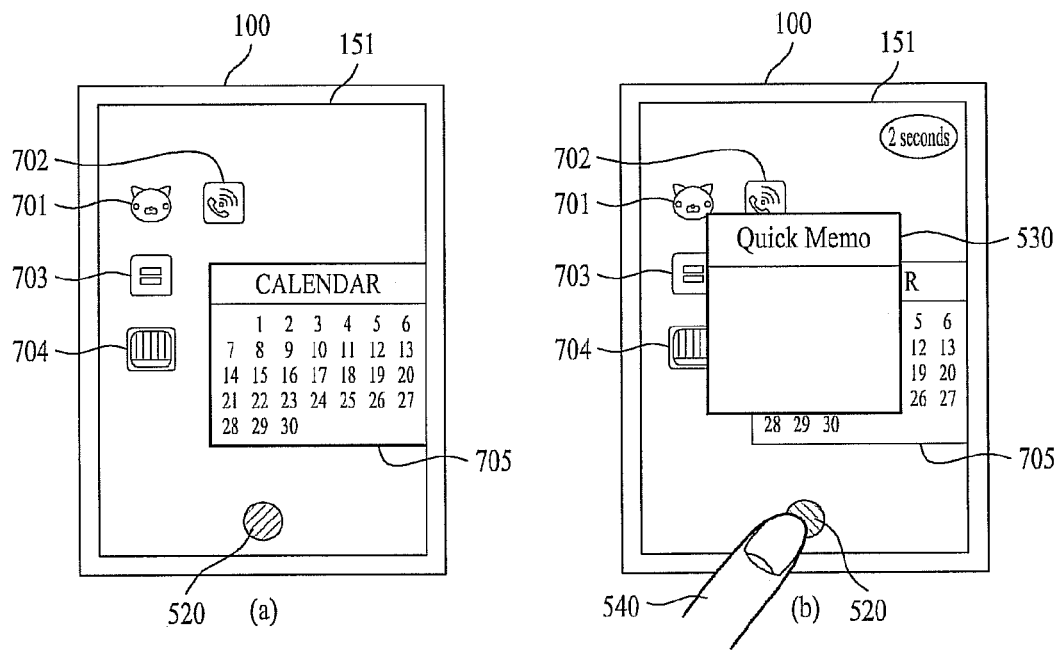
Figure 7B:
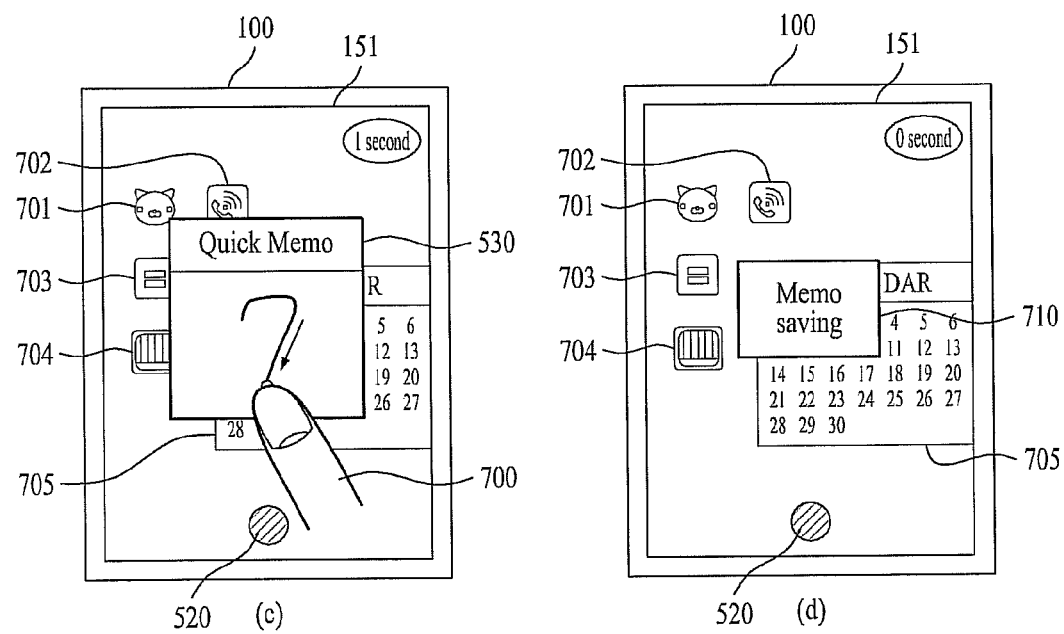

FIG. 7A and FIG. 7B are diagrams of actions to execute a memo application according to the present invention.

Referring to FIG. 7A, for example of an action to execute a memo application of a memo writing, the memo application is maintained while a $1^{st}$ user action is maintained.

FIG. 7A (a) shows a screen displayed on the touchscreen before a $1^{st}$ user action is inputted. FIG. 7A (b) shows a screen displayed on the touchscreen after the $1^{st}$ user action has been inputted.

Referring to FIG. 7A (c), while the $1^{st}$ user action is maintained, a memo input action is performed. As the $1^{st}$ user action is maintained, a memo window 530 is displayed on the touchscreen 151. A memo can be inputted to the displayed memo window 530 by a touch & drag action. For instance, a numeral '267' is inputted as a memo content to the displayed memo window 530.

Referring to FIG. 7A (d), the action of writing the memo is terminated and the $1^{st}$ user action for executing the memo application is ended as well. If the action of touching the memo icon 520, i.e., the $1^{st}$ user action, is terminated, the controller 180 analyzes the memo content written in the memo window 530 and then saves the corresponding memo content.

In particular, referring to FIG. 7A, the memo application is executed only if the $1^{st}$ user action of touching the memo icon 520 is maintained. Therefore, if the $1^{st}$ user action is terminated, it is able to set to memo application to be ended as well.

Referring to FIG. 7B, for another example of an action to execute a memo application for a memo writing, after a $1^{st}$ user action has been initiated, the memo application is executed for a predetermined period of time.

FIG. 7B (a) shows a screen displayed on the touchscreen before a $1^{st}$ user action is inputted. FIG. 7B (b) shows a screen displayed on the touchscreen after the $1^{st}$ user action has been inputted. In case shown in FIG. 7B, the memo application is not executed only if the $1^{st}$ user action is maintained. Instead, if the $1^{st}$ user action is initiated, it is able to set the memo application to be executed for a predetermined period of time only. In particular, if the memo icon 520 is touched through the $1^{st}$ user action, it is able to set a memo to be performed for a predetermined time (e.g., 2 seconds) from a touch initiation only.

FIG. 7B (c) shows an action of inputting a memo for a predetermined time (e.g., 2 seconds) during which a memo application is executed. A specific numeral '7' is inputted as a memo content to the memo window 530 via a touch & drag action.

Referring to FIG. 7B (d), if the predetermined time passes, the inputted memo content is analyzed and the corresponding memo content is then saved.

In particular, in the case shown in FIG. 7B, if the memo icon 520 is touched once via the $1^{st}$ user action, the corresponding memo application is executed for the predetermined time. And, it is able to set the $1^{st}$ user action not to be maintained.

Meanwhile, according to the above description, after a $1^{st}$ user action has been performed, a memo application is run during a predetermined period of time only. Alternatively, after a user action for inputting a memo selectively has been terminated, it is able to set a memo application to be ended after elapse of a predetermined time from the timing point of terminating the user action. In particular, only if it is determined that there is no user action to input a memo, a memo application is ended and a memo content can be saved.

Figure 8A:
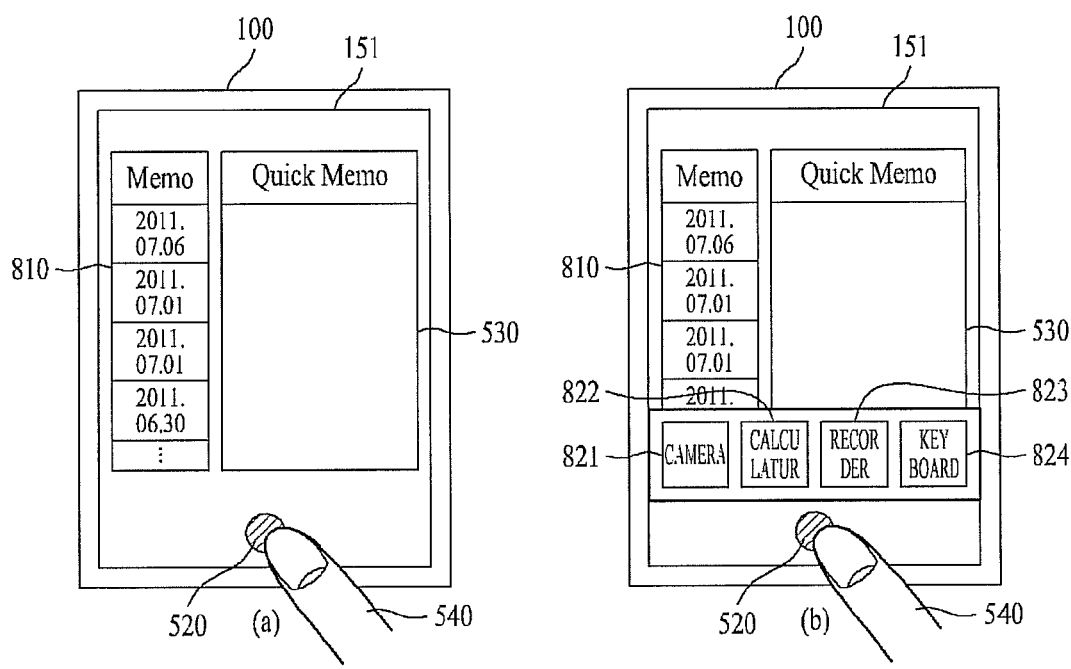
FIG. 8A and FIG. 8B are diagrams of an action for displaying a memo window according to the present invention.
Figure 8B:
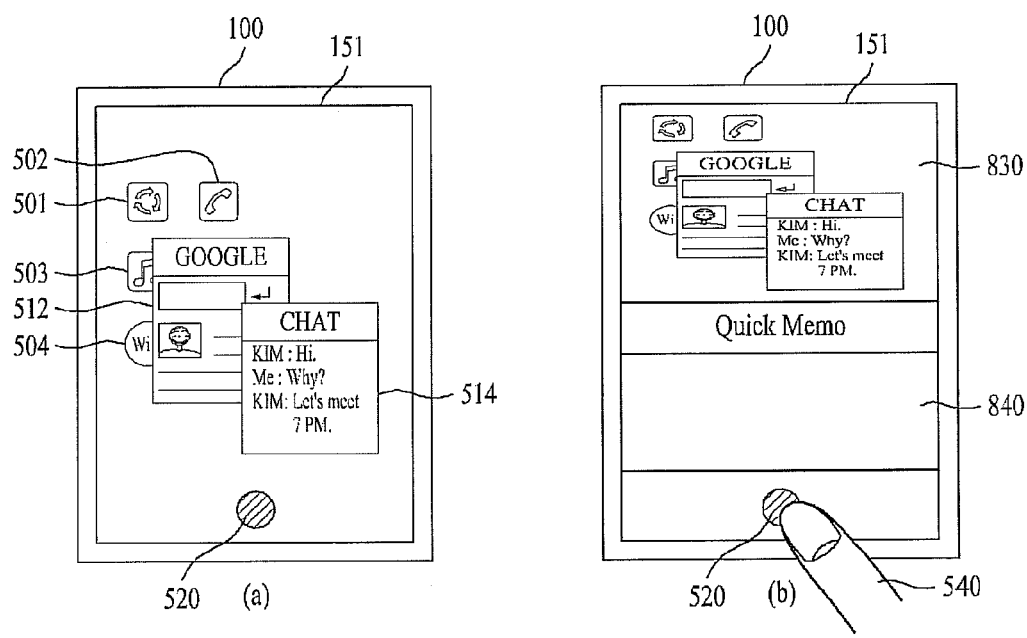

FIG. 8A and FIG. 8B are diagrams of an action for displaying a memo window according to the present invention.

First of all, in case that the memo application is executed by inputting the above-mentioned $1^{st}$ user action, a memo window 530 to receive an input of a memo is displayed on the touchscreen 151. In doing so, a shape, size, position and the like of the memo window 530 are non-limited by a specific format. And, a function of the memo window 530 is to receive an input of a memo by providing a region for enabling a user to write a memo.

FIG. 8A shows various functions of the memo window 530.

Referring to FIG. 8A (a), a list 810 of previous memo files can be displayed on the touchscreen 151 as well as the memo window 530. As the memo application is executed, when the memo window 530 is displayed, the memo files previously saved in the memory 160 can be displayed together with the memo window 530.

Referring to FIG. 8A (b), the touchscreen 151 is able to provide side functions 821 to 824 related to the memo as well as the memo window 530 and the memo file list 810. For instance, a camera function 821 to be provided with an external image, a calculator function 822 for calculation, a recorder function 823 for recording, a keyboard function 824 for a text input and the like can be provided as functions for helping the memo writing in association with the memo together with the memo window 530.

FIG. 8B shows one example of various shapes of the memo window 530.

Referring to FIG. 8B (a), a screen right before executing a memo application is displayed on a touchscreen 151.

Referring to FIG. 8B (b), a memo application is executed by a user action 540 of touching a memo icon 520. In the former description, the former memo window 530 is displayed on a central region of the touchscreen 151. Yet, a memo window can be displayed on a bottom region 840 of the touchscreen 151. In doing so, the former screen (FIG. 8B (a)) right before executing the memo application can be displayed on a top region 830 of the touchscreen 151. Through this, even if the memo application is executed, a display of various kinds of the previously executed applications can be set not to be affected.

Figure 9:
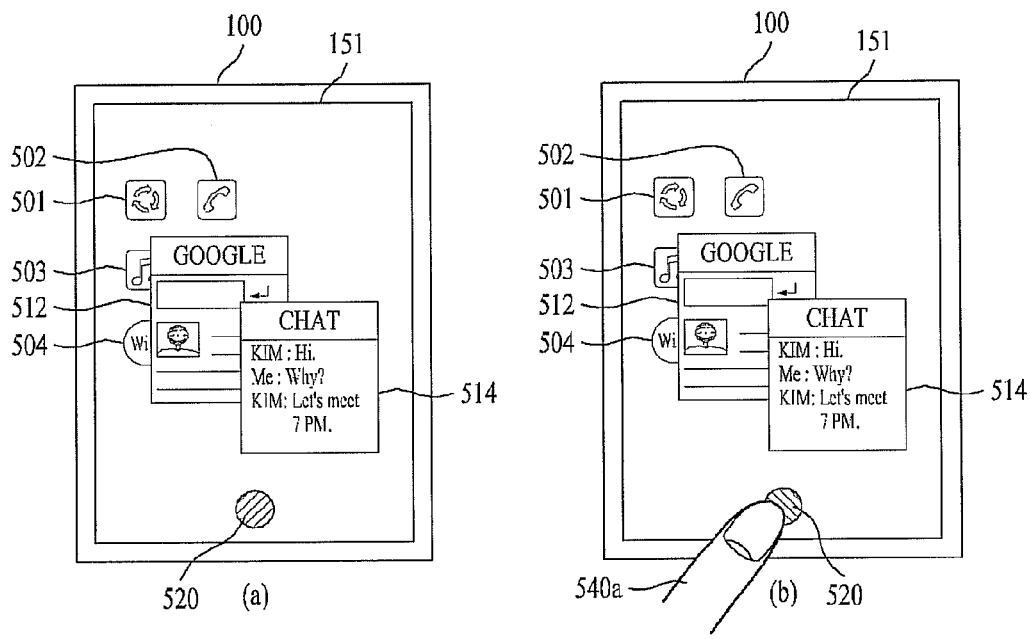
FIG. 9 is a diagram for an operation of displaying an action for writing a memo without a memo window according to the present invention.
Figure 9:
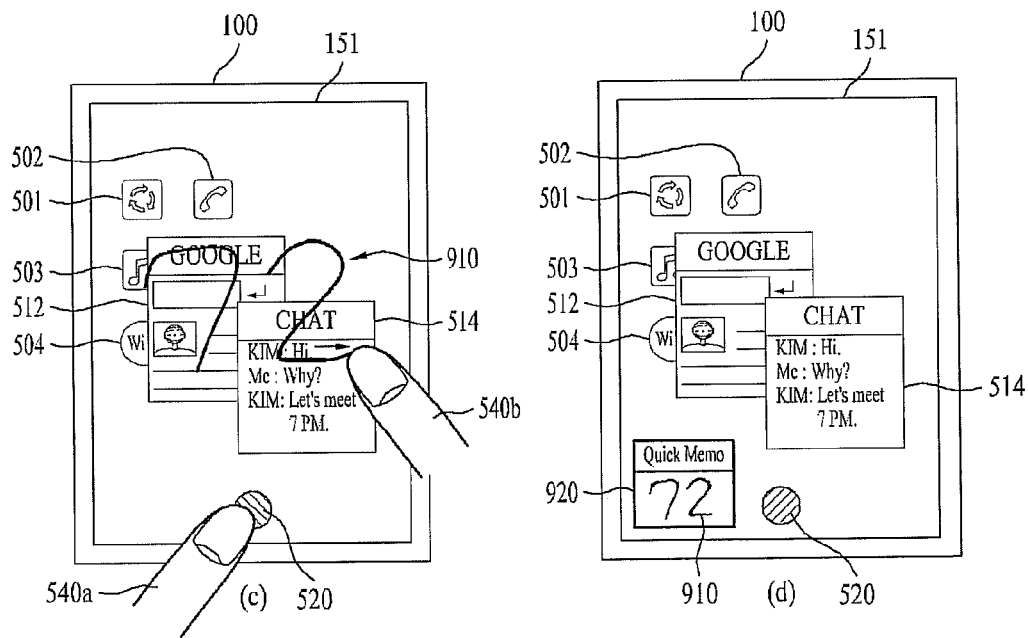

FIG. 9 is a diagram for an operation of displaying an action for writing a memo without a memo window according to the present invention.

Referring to FIG. 9, a memo window is not displayed even if a memo application is executed. According to the former descriptions, if the $1^{st}$ user action is initiated, the memo window is displayed on the touchscreen 151 as soon as the memo application is executed. Yet, according to the embodiment shown in FIG. 9, a memo can be directly written on the touchscreen 151 without displaying a memo window. A display screen, which was displayed on the touchscreen 151 before executing the memo application, may be blocked by the memo window or a size of the corresponding display screen may be adjusted. Therefore, a method of performing a memo function without affecting other applications previously displayed is described as follows.

FIG. 9 (a) shows a screen of a touchscreen 151 right before a memo application is executed.

Referring to FIG. 9 (b), a user performs a touch action 540a as a $1^{st}$ user action on a memo icon 520. Although a memo application is executed by the $1^{st}$ user action, a memo window is not displayed on the touchscreen 151. Yet, the controller 180 recognizes the memo application has been executed and can be then ready to receive an input of a $2^{nd}$ user action from the touchscreen 151.

Referring to FIG. 9 (c), while the memo application keeps being executed by means of maintaining the $1^{st}$ user action, a $2^{nd}$ user action is inputted.

As the memo application is being executed, a whole region of the touchscreen 151 is ready to receive an input of the $2^{nd}$ user action. In doing so, if a specific numeral '72' is inputted via the touchscreen 151 by a touch drag corresponding to the $2^{nd}$ user action, the controller 180 analyzes the corresponding memo content '72' as a memo content.

Although FIG. 9 (c) shows that the memo content '72' is displayed along a touch drag trace 910 on the touchscreen 151, the illustration is just exemplary. Alternatively, for example, although a specific memo content can be inputted by the $2^{nd}$ user action via the touchscreen 151, it is able to set the corresponding memo content not to be displayed on the touchscreen 151. In particular, despite that the corresponding memo content is not actually displayed on the touchscreen 151, the controller 180 analyzes the memo content inputted by the $2^{nd}$ user action and then controls the analyzed memo content to be saved.

Referring to FIG. 9 (d), as the memo application is ended, the memo content is saved. The memo application is ended as soon as the $1^{st}$ user action is terminated. And, the memo content inputted by the $2^{nd}$ user action can be saved in the memory 160 at the same time. In the drawing, after the memo application has been ended, the memo content can be checked by a user in a manner that the numeral inputted as the memo is displayed on a specific window 920.

FIGS. 10A to 10D are diagrams for a $2^{nd}$ user action of inputting a memo according to the present invention.

First of all, in the present specification, there is a $2^{nd}$ user action as a user action discriminated from a $1^{st}$ user action. In the present specification, the $2^{nd}$ user action is the action inputted from a user to receive an input of a real memo content in the course of executing a memo application. The $2^{nd}$ user action is an action to receive an input of a memo content, which is non-limited by a specific format. For instance, the $2^{nd}$ user action can include such an action as an action of relieving an input to a memo window via a touch & drag action, an action of recording an audio via a microphone, an action of selecting a specific content displayed on the touchscreen 151, an action of receiving an input of an image via a camera module and the like.

Figure 10A:
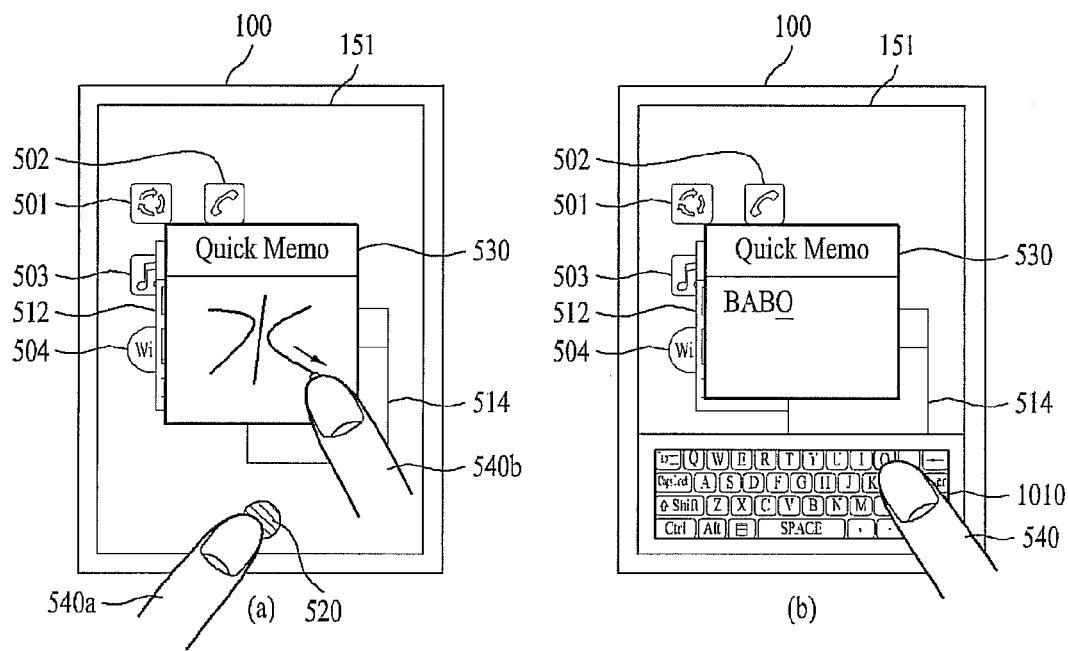
FIGS. 10A to 10D are diagrams for a $2^{nd}$ user action of inputting a memo according to the present invention.

Referring to FIG. 10A (a), a $2^{nd}$ user action is performed in a manner of directly touching a memo window 530 on a touchscreen 151. If the memo window 530 is displayed on the touchscreen 151, the touchscreen 151 is ready to receive an input via the memo window 530. Therefore, it is able to input a specific memo content through a direct touch action on the memo window 530, e.g., a touch & drag action. A content displayable by the touch & drag action can include one of a numeral, a text and the like. Moreover, the displayable content can include such a shape as a picture and the like.

Referring to FIG. 10A (b), a $2^{nd}$ user action is inputted to a memo window 530 on a touchscreen 151 via a keyboard 540. If a memo content is directly inputted by a touch action via the memo window 530, a desired character can be correctly inputted. Therefore, it is able to input a desired character or numeral by means of displaying a keyboard.

Figure 10B:
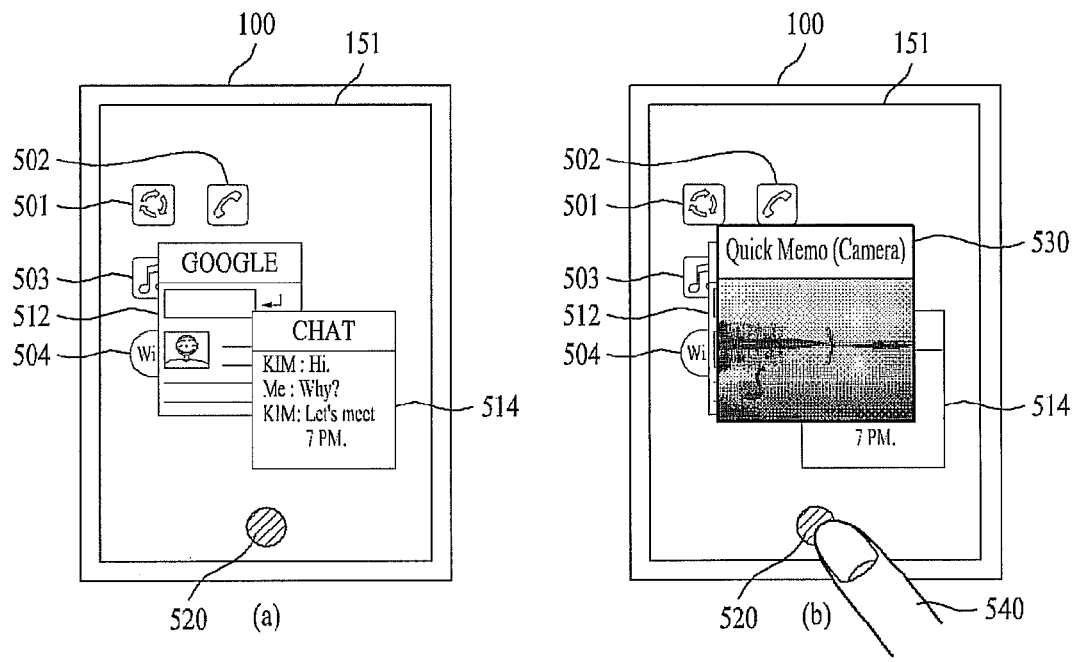
Figure 10B:
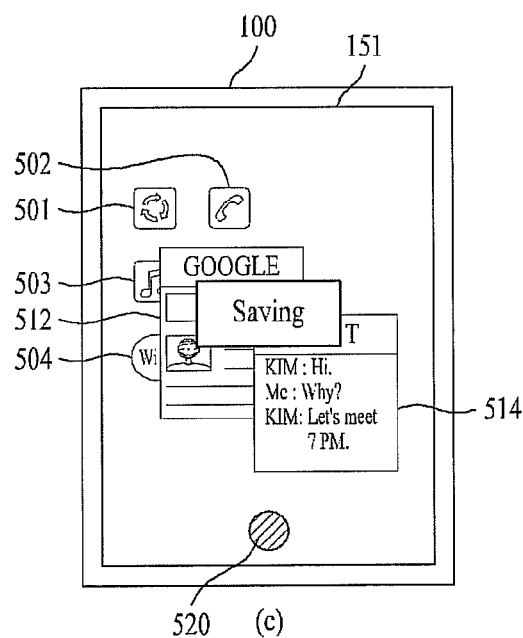

FIG. 10B shows a $2^{nd}$ user action of inputting a memo by an input scheme using the camera module 121.

First of al, a $2^{nd}$ user action of inputting a memo is non-limited by an input scheme via the touchscreen 151. The object of writing a memo may be to input a specific text content or to save a peripheral image urgently. Hence, in case of executing a memo application, an external image can be selectively inputted as a memo content.

Referring to FIG. 10B (a), a display screen of a touchscreen 151 right before executing a memo application is shown.

Referring to FIG. 10B (b), if a memo icon 520 is touched by a $1^{st}$ user action, a memo application is executed. As the memo application is executed, a memo window 530 is displayed on the touchscreen 151. If the memo application is executed, the controller 180 is able to activate the camera module 121. As the camera module 121 is activated, an image is inputted externally. In this case, the image includes a still picture or a moving picture.

Referring to FIG. 10B (c), the memo application is ended as soon as the $1^{st}$ user action is terminated. In doing so, the image inputted from the camera module 121 is saved.

Figure 10C:
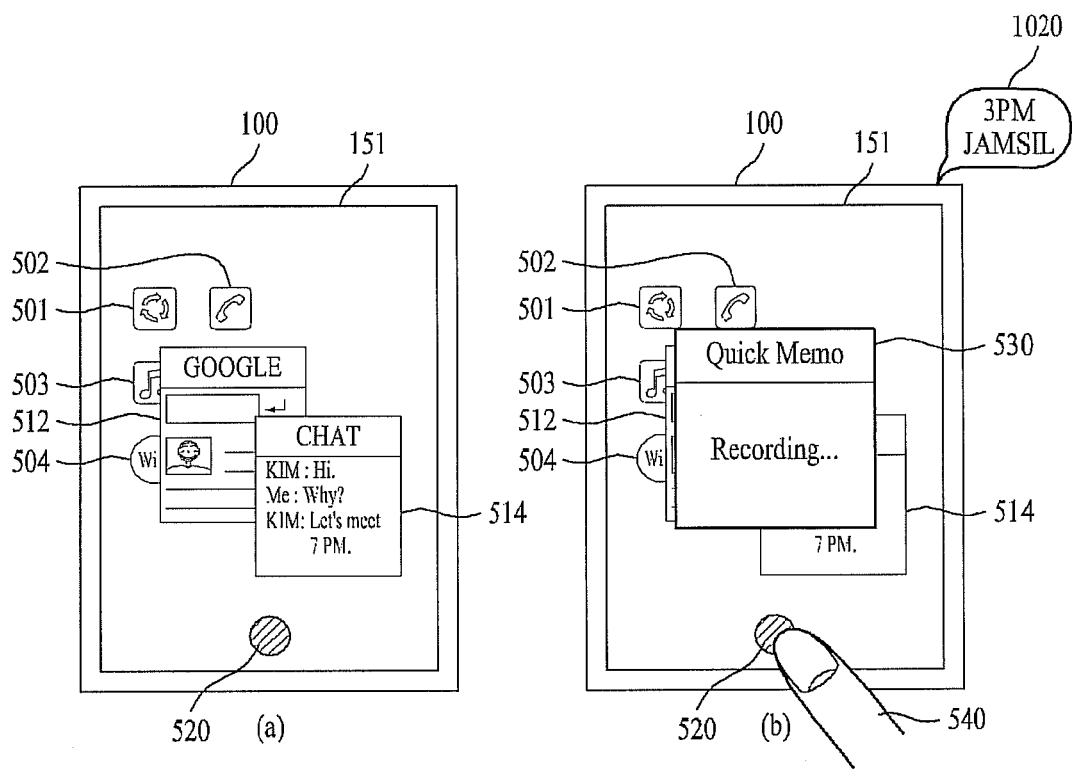
Figure 10C:
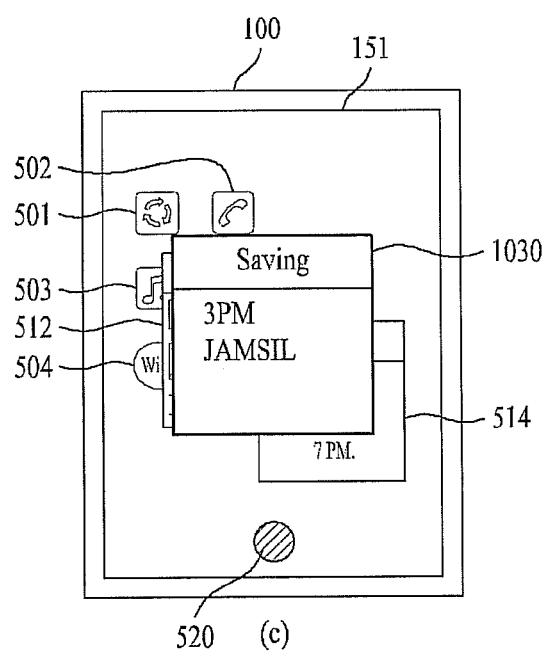

FIG. 10C shows a $2^{nd}$ user action of inputting a memo by an input scheme via the microphone module 122.

First of all, a $2^{nd}$ user action of inputting a memo is able to consider an audio input scheme using the microphone module 122 as well as an image input scheme using the camera module 121. In case of inputting a memo content, there is a case that an audio memo scheme is more suitable than a text memo scheme. For this case, the input scheme via the microphone module 122 can be considered as the $2^{nd}$ user action.

Referring to FIG. 10C (a), a screen right before executing a memo application is displayed on the touchscreen 151.

Referring to FIG. 10C (b), if a memo icon 520 is touched by a $1^{st}$ user action, a memo application is executed. As the memo application is executed, a memo window 530 is displayed on the touchscreen 151. As soon as the memo application is executed, the controller 180 is able to activate the microphone module 122. In this case, the microphone module 122 is able to receive an input of voice or sound 1202 externally. In doing so, the controller 180 is able to receive an input of all voice or sound. Alternatively, the controller 180 separates a user voice from the input and is then able to receive the separated user's voice as a memo content. Moreover, a selectively analyzed memo content can be displayed on a memo window 530.

Referring to FIG. 10C (c), if the $1^{st}$ user action is terminated, the memo application can be ended. If so, an inputted voice memo content can be saved.

Figure 10D:
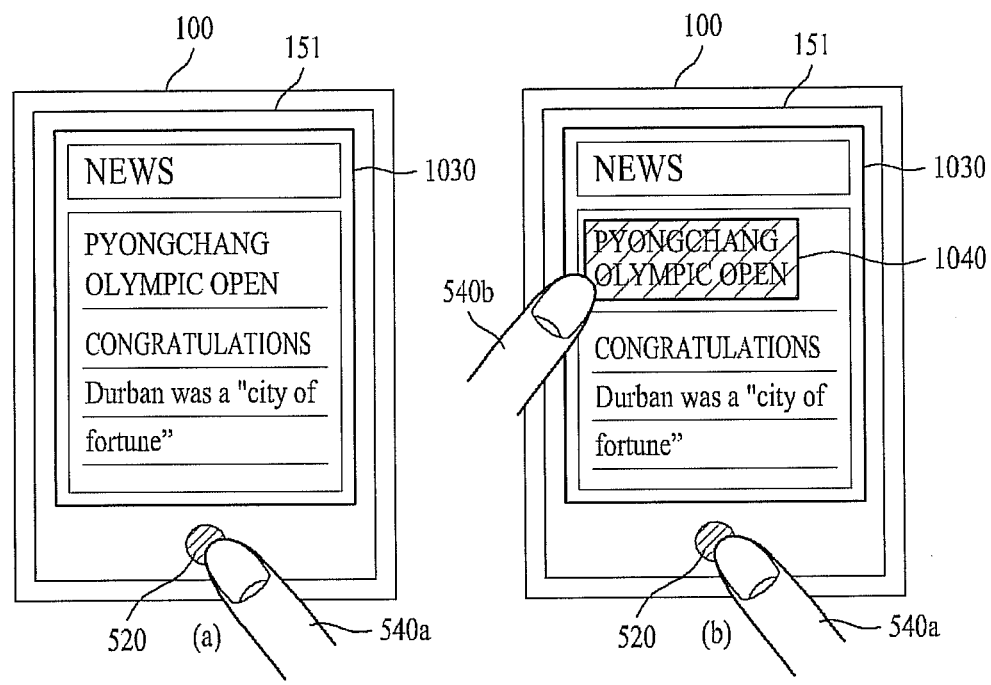
Figure 10D:
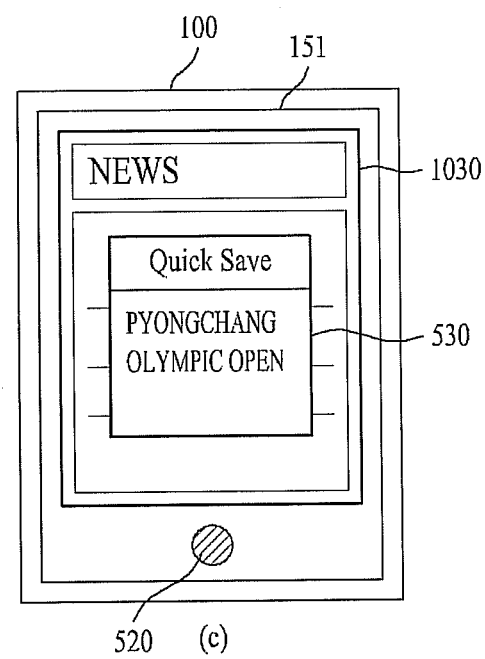

FIG. 10D shows a second user action of inputting a memo by a scheme of directly selecting a specific content displayed on the touchscreen 151.

First of all, although a memo is generally written in a manner that a user writes a specific content in direct, the object of writing a memo may be to copy a displayed different content. For instance, while specific site contents are viewed on the touchscreen 151, if a desired content is found, a user may intend to write a memo of the corresponding content. For this, the present invention quickly executes a memo application to enable the corresponding content to be saved in a manner of being written into a memo in direct.

Referring to FIG. 10D (a), a memo application can be executed by a $1^{st}$ user action. A specific news application 1030 is displayed on the touchscreen 151. And, various kinds of news contents are displayed.

Referring to FIG. 10D (b), while the memo application is being executed by the $1^{st}$ user action, a $2^{nd}$ user action to select a specific content is performed. In case of recognizing that the application is executed by the $1^{st}$ user action, the controller 180 is able to set the touchscreen to enter a mode for receiving an input of a specific content. Hence, in the drawing, if a touch action 540b of selecting the specific content exists as a $2^{nd}$ user action, the touchscreen 151 or the controller 180 analyzes the corresponding touch action and then determines the selected content. In the drawing, the controller 180 determines that a specific article content 1040 is selected by the $2^{nd}$ user action. In particular, while the memo application is being executed, if a specific content is selected, the controller 180 is able to recognize the selection as a command for saving the specific content via the memo application.

Referring to FIG. 10D (c), after the specific content has been selected by the $2^{nd}$ user action, the $1^{st}$ user action is terminated and the memo application is ended. Since the memo application is ended, the selected specific content can be saved in the memory 160.

Figure 11A:
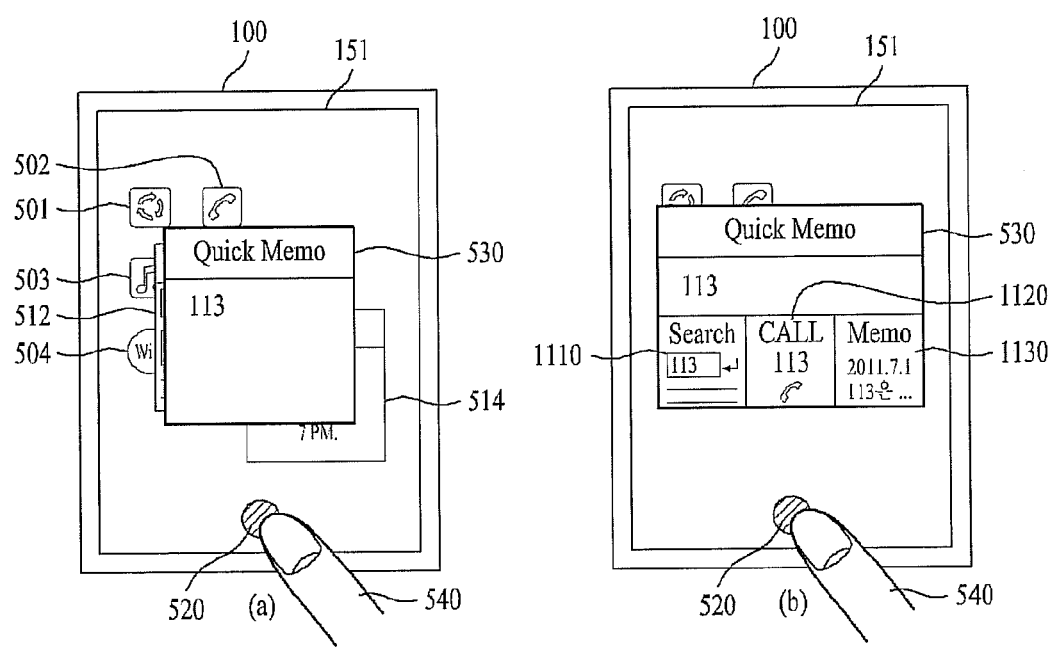
FIG. 11A and FIG. 11B are diagrams for an action of utilizing a written memo according to the present invention.
Figure 11B:
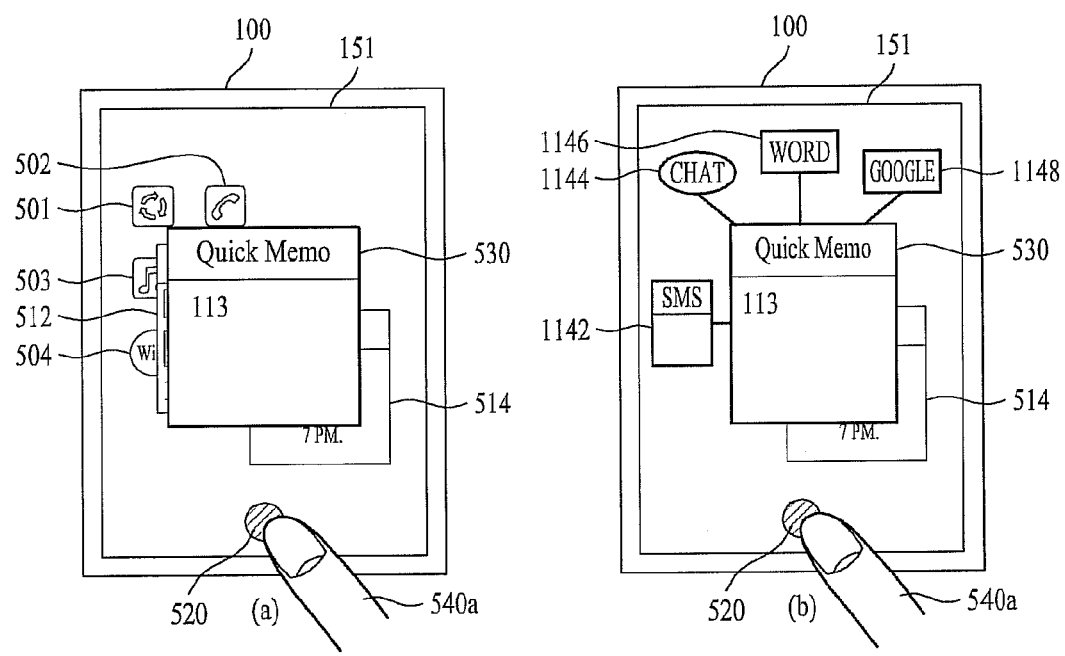
Figure 11B:
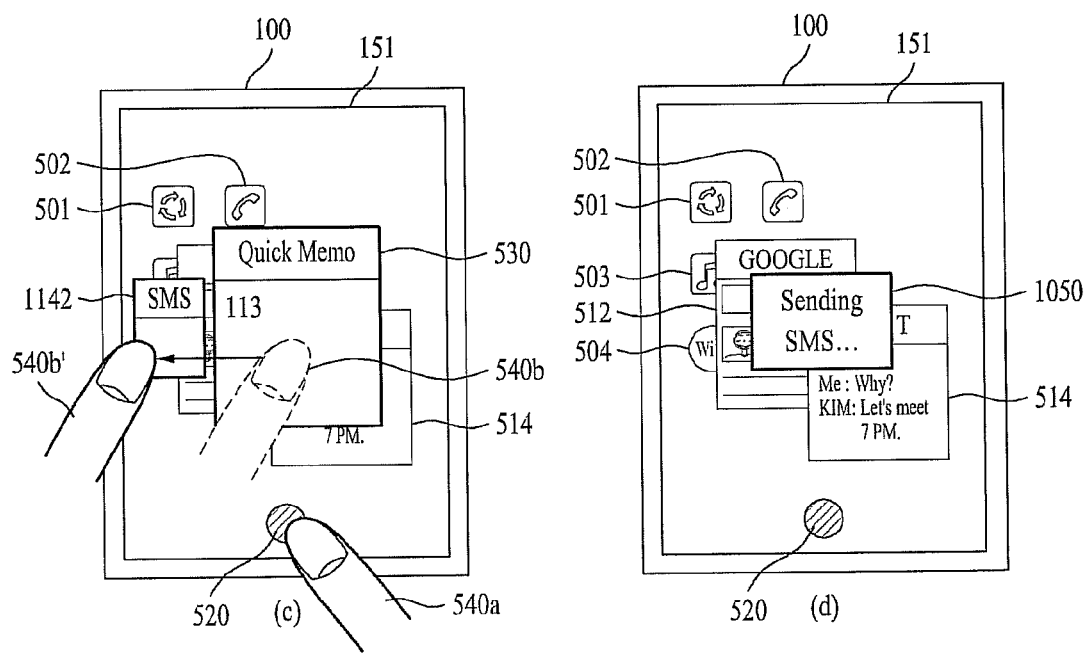

FIG. 11A and FIG. 11B are diagrams for an action of utilizing a written memo according to the present invention.

First of all, according to the present invention, in case that various memo contents are inputted, various functions can be executed via the corresponding memo content. For instance, the memo content is directly analyzed to execute an application related to the analyzed memo content or other related files are directly found and displayed.

FIG. 11A shows that a written memo content is analyzed to directly display a related application.

Referring to FIG. 11A (a), a memo application is executed via a $1^{st}$ user action and a specific memo content '113' is inputted via a memo window 530.

Referring to FIG. 11A (b), various applications related to the memo content are displayed on the touchscreen 151. The controller 180 is able to analyze the inputted memo content quickly. If an application or file related to the analyzed memo content exists, the controller 180 is able to control the corresponding application or file to be displayed on the touchscreen 151. Optionally, it is able to apply a corresponding memo content via a basically set application. For instance, by setting a search application 1110 as a basic application, it is able to set the memo content to be directly searched. Alternatively, if the memo content is a numeral, it is able to set a call to be made via a phone application 1120. Besides, it is able to display an application 1130 showing a different memo content containing a related memo content.

FIG. 11B shows that a written memo content is directly forwarded to a different application.

Referring to FIG. 11B (a), in a manner similar to that shown in FIG. 11A (a), a memo application is executed by a $1^{st}$ user action. And, a specific memo content '113' is inputted via a memo window 530.

Referring to FIG. 11B (b), if a $2^{nd}$ user action is inputted via the memo window 530, at least one or more related applications 1142, 1144, 1146 and 1148 can be displayed on the touchscreen 151. For instance, an SMS application 1142, a chat application 1144, a word application 1146 and a search application 1148 can be set to be displayed centering on the memo window 530.

Referring to FIG. 11B (c), a memo content is inputted by the $2^{nd}$ user action. And, the corresponding memo content is forwarded by selecting a specific application. The present invention enables a written memo content to be set to be quickly utilized by a different application. Hence, the SMS application 1142 is selected from a plurality of the applications 1142, 1144, 1146 and 1148 and the memo content can be forwarded to the selected SMS application 1142.

Referring to FIG. 11B (d), if the memo application is ended as soon as the $1^{st}$ user action is terminated, the memo content forwarded to the SMS application 1142 is transmitted in accordance with an operation of the SMS application 1142.

Figure 12:
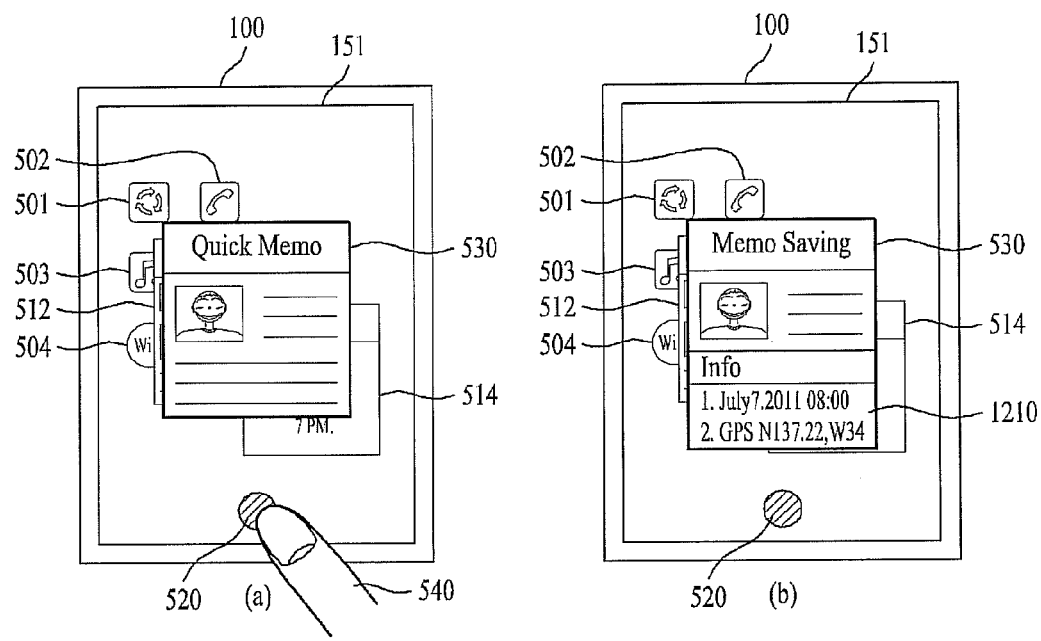
FIG. 12 is a diagram for a memo saving action according to the present invention.

FIG. 12 is a diagram for a memo saving action according to the present invention.

First of all, in case of receiving an input of a memo content by a $2^{nd}$ user action, the controller 180 analyzes the corresponding memo content. As mentioned in the foregoing description, the memo content can include one of an image, an audio, a text and the like. If a user inputs specific characters by a $2^{nd}$ user action such as a touch & drag action, the controller 180 saves the specific characters as a drawing of a still picture. Alternatively, the controller 180 selectively recognizes the corresponding specific characters and then saves them as a text.

Meanwhile, regarding the memo saving, various kinds of side informations can be contained in the memo content. For instance, the side information on a memo recorded configuration can be contained. And, various kinds of the side informations including a memo recorded hour, a memo recorded location information, a type of a $2^{nd}$ user action and the like can be saved as memo contents in the memory 160.

Referring to FIG. 12 (a), as a memo application is executed, a memo content containing an image and a text is inputted via a memo window 530.

Referring to FIG. 12 (b), if the $1^{st}$ user action of touching a memo icon 520 is terminated, the memo application is ended. And, a written memo content is then saved. In this case, the written memo content can be saved without adding other information. In the drawing, such a side information 1210 as a memo written hour, a location information of a memo written timing is saved by being contained in the memo content.

Figure 13:
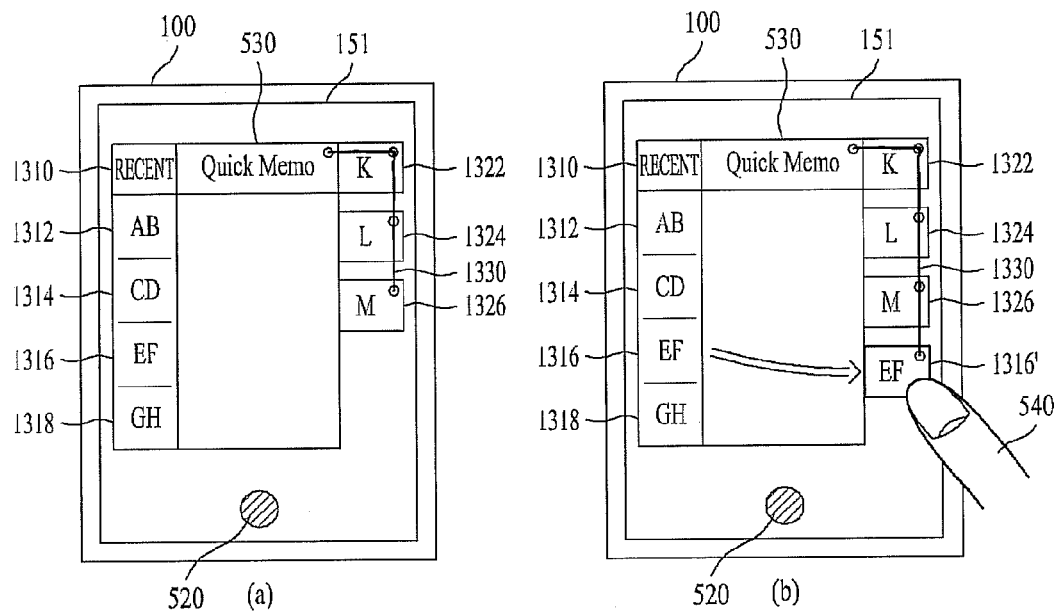
FIG. 13 is a diagram for an action of utilizing a saved memo file according to the present invention.
Figure 13:
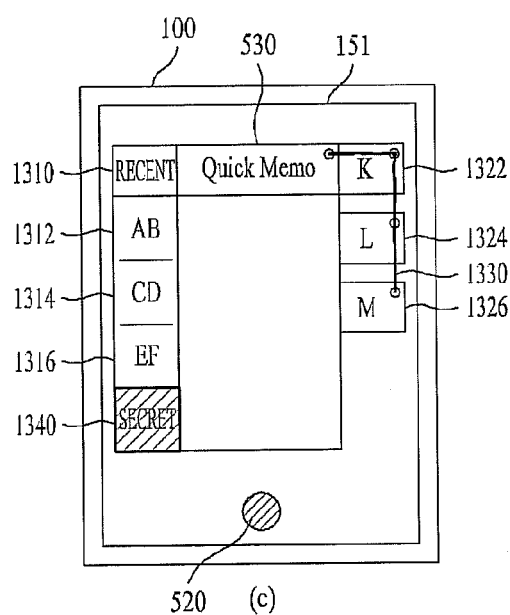

FIG. 13 is a diagram for an action of utilizing a saved memo file according to the present invention.

First of all, the present invention is able to utilize the saved memo contents in various ways.

Referring to FIG. 13 (a), a recent memo file list 1310 and a plurality of linked memo file lists 1322, 1324 and 1326 are displayed on a touchscreen 151 as well as a memo window 530. A plurality of memo contents saved via a memo application can be displayed on the recent memo list 1310, 1312, 1316 and 1318 in a recently written order. Moreover, the present invention is able to display memo files related to each other in a manner of being linked to each other. The linked memo file lists 1322, 1324 and 1326 are displayed on the touchscreen 151. The linked memo file lists 1322, 1324 and 1326 are displayed as if linked to each other via a single link line 1330. Through this, a user is able to recognize the linked memo file lists 1322, 1324 and 1326 visually and clearly.

Alternatively, the memo file lists can be sorted in such order as name, significance, memo content and the like instead of using the representation of the recent memo file list.

Referring to FIG. 13 (b), an action of editing the linked memo file list is shown. The memo file lists, which look as if linked to each other, can be added or deleted. In this case, a specific memo file 1316 in the recent memo lists 1312, 1314, 1316 and 1318 can be displayed as linked by a touch action.

Compared to FIG. 13 (a) and FIG. 13 (b), FIG. 13 (c) shows that a specific memo file 1340 is represented as 'SECRET'. Various kinds of saved memo files can be set in accordance with various types via the memo application. In particular, the memo file can be set as a secret memo file provided to a specific user only. If the memo file is set as the secret memo file, it can be set to be provided only if decrypted via a password.

Figure 14:
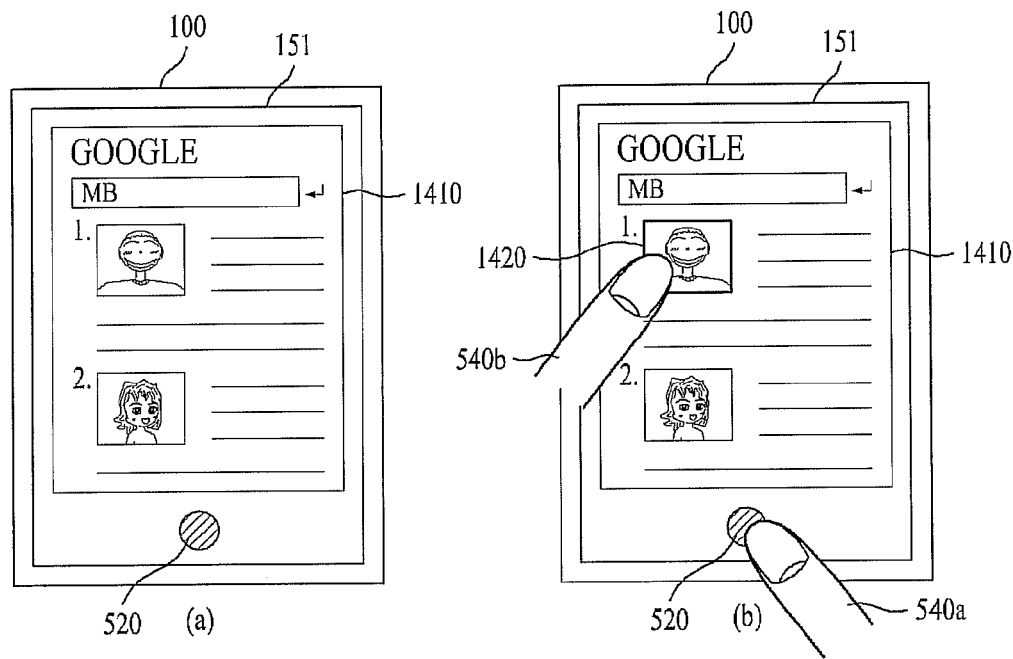
FIG. 14 is a diagram for an action related to a memo saving and a memo display according to the present invention.
Figure 14:
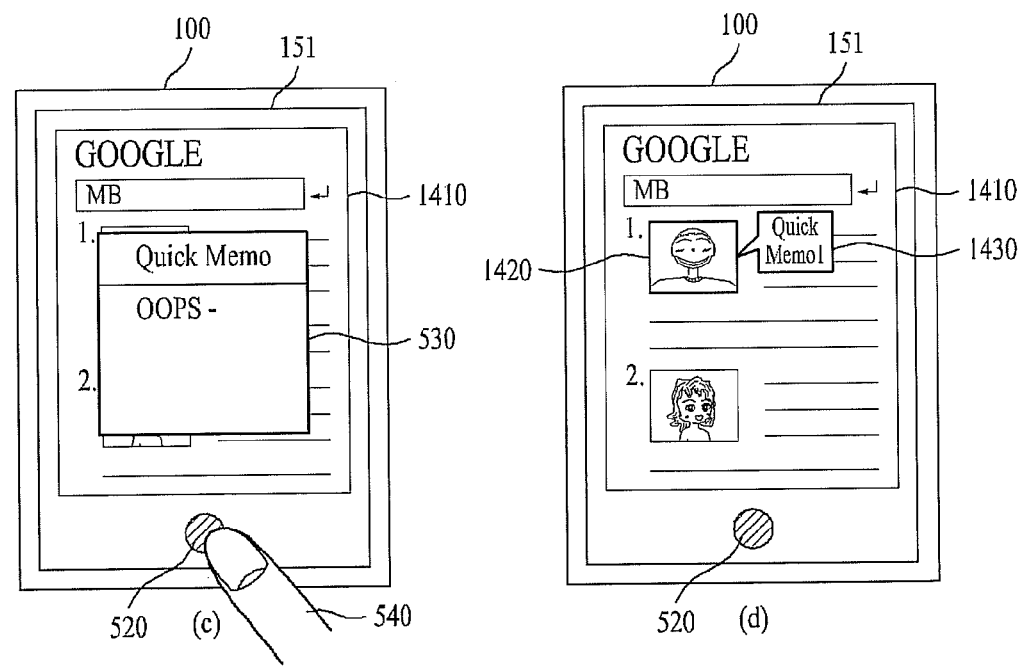

FIG. 14 is a diagram for an action related to a memo saving and a memo display according to the present invention.

First of all, according to the present invention, a memo can be saved and displayed in a manner of saving or displaying a memo for a specific region or content displayed on a touchscreen 151. For instance, when a specific internet site is displayed on the touchscreen 151, it is able to set a memo to be recorded for a specific image of the specific internet site.

Referring to FIG. 14 (a), a screen right before executing a memo application is displayed on the touchscreen 151. In doing so, a specific internet site 1410 is displayed on the touchscreen 151.

Referring to FIG. 14 (b), a memo application is executed by a $1^{st}$ user action, i.e., an action 540a of touching a memo icon 520. Although a memo window for receiving an input of a memo is not displayed, the touchscreen 151 is ready to receive an input of a $2^{nd}$ user action to input a memo action. In case that the $2^{nd}$ user action for selecting a specific image 1420 in a specific internet site 1410 exists, the controller 180 recognizes the $2^{nd}$ user action as a memo for the corresponding image 1420 and is then ready to receive an input of a corresponding memo content.

Referring to FIG. 14 (c), the memo content for the selected image 1420 is inputted via a memo window 530. In particular, a specific memo content is inputted via the memo window 530.

Referring to FIG. 14 (d), as the $1^{st}$ user action is terminated, the memo application is ended. As soon as the memo application is ended, a written memo is saved. In doing so, the written memo content is not saved in the memory 160 simply but can be displayed for the corresponding image 1420. In particular, referring to the drawing, an indication window 1430 is used to indicate that the memo has been written for the corresponding image 1420. Thus, it is able to write a memo content for a specific content or a specific location. And, it is also able to display the memo content.

Figure 15A:
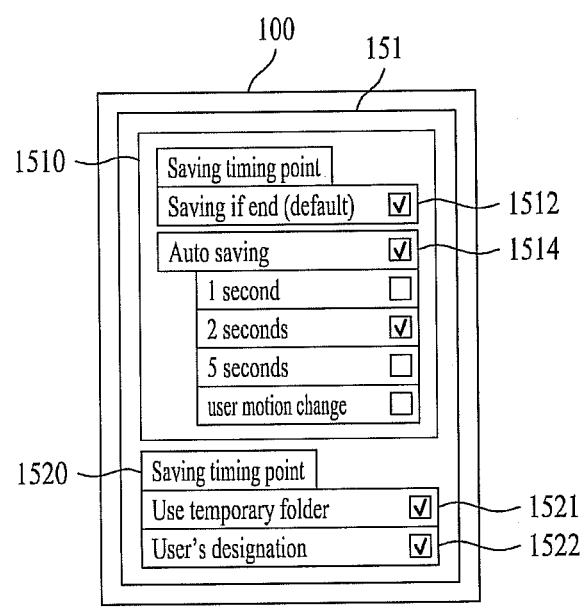
FIG. 15A and FIG. 15B are diagrams for an action related to a memo saving timing point and a memo saving place according to the present invention.
Figure 15B:
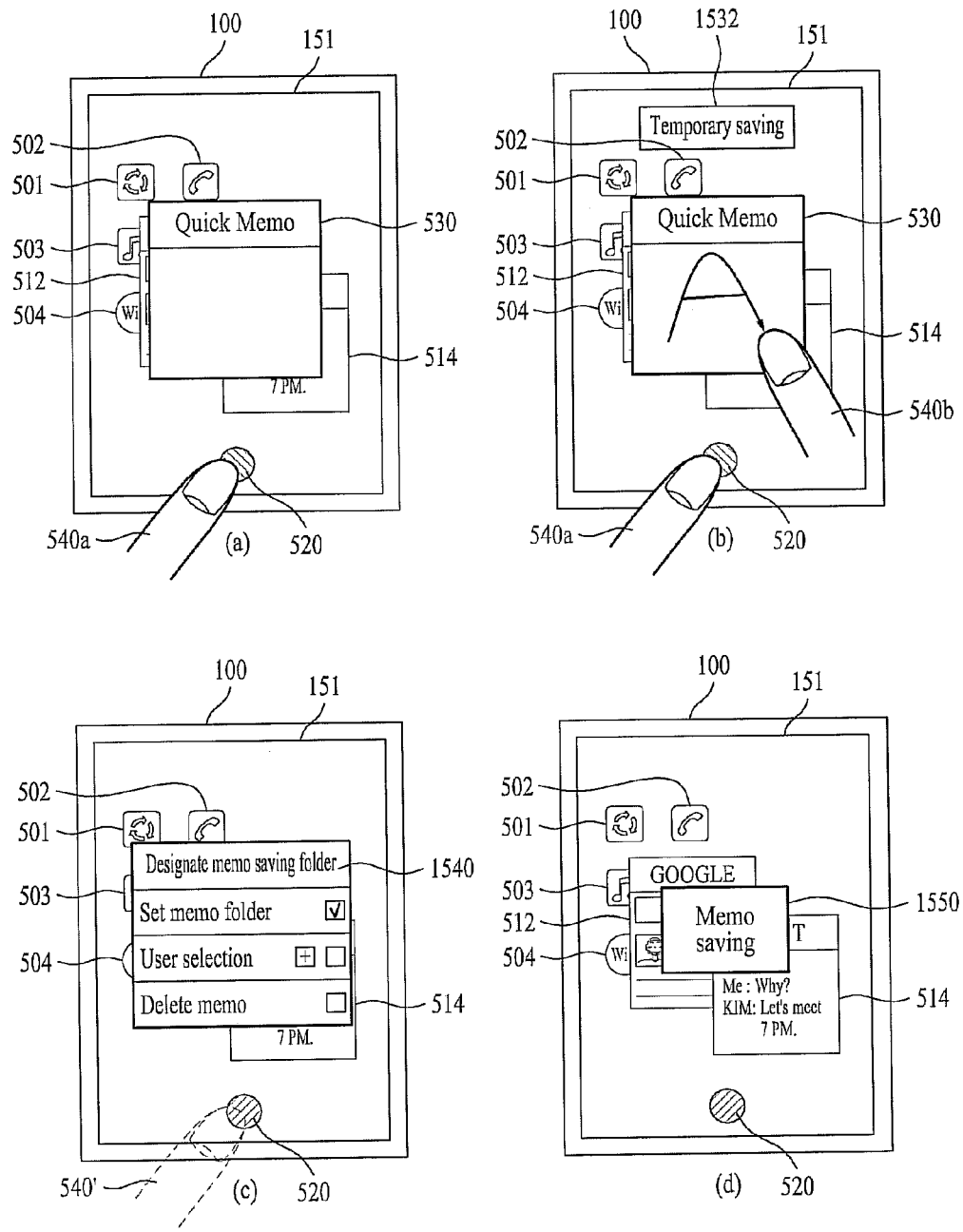

FIG. 15A and FIG. 15B are diagrams for an action related to a memo saving timing point and a memo saving place according to the present invention.

First of all, a mobile terminal 100 according to the present invention is able to save a memo by a user action. Meanwhile, various schemes of saving memos can exist. Regarding the various memo schemes, the mobile terminal 100 according to the present invention is able to set a memo saving timing point and a memo saving folder in various ways.

Referring to FIG. 15A, a menu related to a memo saving by a user action is displayed. In saving a memo via a memo application, as mentioned in the foregoing description, the present invention is able to save the memo as soon as a $1^{st}$ user action is terminated. In addition, the present invention is able to temporarily save a memo in the course of writing the memo. In particular, an auto saving function 1514 of the menu 1510 relates to a function of saving a memo automatically in accordance with a time or a user motion in the course of writing the memo in association with a memo saving. Hence, in case of catching a change of a user motion (e.g., touch & drag) for writing the memo, the controller 180 is able to temporarily save the written memo. Alternatively, the controller 180 is able to temporarily save the memo after elapse of time (e.g., 1 second, 2 seconds, 5 seconds, etc.).

The present invention is able to set a memo saving folder in various ways. The mobile terminal 100 includes the memory 160. And, the memory 160 is able to store a recorded memo. Moreover, the memory 160 is able to include a temporary saving folder or a regular saving folder. If a temporarily saved target is saved in the temporary saving folder, the saving folder is the regular saving folder unless there is a different situation. Referring to FIG. 15A, it is able to determine 'use temporary folder' 1521 or 'user's designation' 1522 via the saving folder menu 1520. Hence, it is able to save a memo in the temporary folder in the course of writing the memo. Moreover, it is able to set a memo to be saved in a desired folder through the 'user's designation'. Meanwhile, the memo temporarily saved in the temporary saving folder is saved in the regular saving folder as soon as the memo application is ended. The temporarily saved memo can be deleted from the temporary saving folder as well.

FIG. 15B shows an action related to an action of a temporary saving of a written memo and an action of a saving folder designation according to the present invention.

Referring to FIG. 15B (a), a memo window 530 is displayed on the touchscreen 151 in accordance with a $1^{st}$ user action 540a.

Referring to FIG. 15B (b), a user's memo writing action is performed on the memo window 530 by a $2^{nd}$ user action 540b. And, the controller 180 is able to temporarily save a currently written memo in the memory 160. A temporary saving place can include a regular saving folder set as a default or a temporary saving folder. And, a temporary saving icon 1532 can be displayed on the touchscreen 151 to indicate that a memo is being saved.

Referring to FIG. 15B (c), if the $1^{st}$ user action is terminated, the memo application is ended. And, the memo window correspondingly disappears from the touchscreen 151. In doing so, the controller 180 is able to display a menu 1540 for inquiring a user of a scheme of processing the temporarily saved memo on the touchscreen 151. In this case, the menu 1540 can contain a function of saving the corresponding memo in a set memo folder, a function of selecting a folder by a user selection, a function of deleting the corresponding memo and the like.

Referring to FIG. 15B (b), if the function of saving the temporarily saved memo in the set memo folder is selected, the corresponding memo can be saved in the set memo folder.

According to one embodiment of the present invention, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet).

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
   a touch screen to display a plurality of icons including a memo icon related to a memo application, to receive a first user action at the memo icon for executing the memo application, and to receive a second user action for receiving an input for a memo while the memo application is executing; and
   a controller to execute the memo application while the first user action is maintained, and to analyze the second user action and produce a memo content according to the analyzed second user action,
   wherein when the first user action for executing the memo application and the second user action for selecting a specific image in a specific internet site exist, a memo window for the selected specific image is displayed,
   when the memo content is inputted via the memo window, the memo content is to correspond to the selected specific image,
   in response to receiving the memo content, while the first user action is maintained, at least one application related to the memo content is displayed within the memo window and can be selected, and in response to selecting the at least one application, automatically forwarding the memo content to the selected application; and
   when the first user action is terminated, the memo content corresponding to the selected specific image is displayed adjacent to the selected specific image,
   wherein the second user action includes a touch action to select the specific image displayed on the touch screen, and wherein the controller:
      to save the memo content for the specific image selected by the second user action in accordance with the execution of the memo application, and
      to display an indication window adjacent to the specific image when the first user action is terminated, wherein the indication window indicates that the memo content has been written for the specific image.

2. The mobile terminal of claim 1, wherein the touch screen displays the produced memo content after producing the memo content.

3. The mobile terminal of claim 1, wherein the touch screen displays the memo icon related to the memo application, and wherein the first user action includes a touch action on the memo icon.

4. The mobile terminal of claim 1, wherein the first user action includes a touch action on a specific position of a display region of the touch screen.

5. The mobile terminal of claim 1, wherein the controller controls a memo window to receive the input of the memo to be displayed on the touch screen by executing the memo application, and wherein the second user action includes a touch action on the memo window.

6. The mobile terminal of claim 1, wherein the controller controls the memo content to be saved in a memory as at least one of a text file, an image file or an audio file.

7. The mobile terminal of claim 1, wherein the controller determines a substance of the memo content, and the controller executes at least one specific application using the determined substance of the memo content.

8. The mobile terminal of claim 7, wherein the at least one specific application includes at least one of an internet search application, a call application, a message sending application or a word processor application.

9. The mobile terminal of claim 1, wherein the second user action includes a touch action to select a specific content displayed on the touch screen, and wherein the controller controls the memo content to be saved for the specific content selected by the second user action in accordance with the execution of the memo application, and
   wherein the controller displays a window indicating that the memo content has been written for the specific content.

10. The mobile terminal of claim 1, wherein the memo icon to shift on the touch screen based on a user's touch.

11. A method of controlling a mobile terminal, comprising:
   executing a memo application when a first user action is maintained at a memo icon, the memo icon corresponding to a memo application;
   receiving a second user action to receive information of a memo via a touch screen while the first user action is maintained and the memo application is executed;
   analyzing the received second user action;
   producing a memo content according to the analyzed second user action; and
   in response to release of the first user action from the memo icon, ending the memo application, wherein when the first user action for executing the memo application and the second user action for selecting a specific image in a specific internet site exist, a memo window for the selected specific image is displayed,
   when the memo content is inputted via the memo window, the memo content is to correspond to the selected specific image,
   in response to receiving the memo content, while the first user action is maintained, at least one application related to the memo content is displayed within the memo window and can be selected, and in response to selecting the at least one application, automatically forwarding the memo content to the selected application; and
   when the first user action is terminated, the memo content corresponding to the selected specific image is displayed adjacent to the selected specific image,
   wherein the second user action includes a touch action to select the specific image displayed on the touch screen, and wherein the method further comprises:
      saving the memo content for the specific image selected by the second user action in accordance with the execution of the memo application, and displaying an indication window adjacent to the specific image when the first user action is terminated, wherein the indication window indicates that the memo content has been written for the specific image.

12. The method of claim 11, further comprising:
displaying the produced memo content after producing the memo content.

13. The method of claim 11, wherein the first user action is based on a touch action on the memo icon displayed on the touch screen.

14. The method of claim 11, wherein the second user action includes a touch action on the memo window.

15. The method of claim 11, wherein the analyzed memo content is saved as at least one of a text file, an image file or an audio file.

16. The method of claim 11, further comprising executing at least one specific application using the memo content.

17. The method of claim 11, wherein the memo icon to shift on the touch screen based on a user's touch.

* * * * *